US008362754B2

(12) United States Patent
Maebara et al.

(10) Patent No.: US 8,362,754 B2
(45) Date of Patent: Jan. 29, 2013

(54) DISCHARGING CONTROL DEVICE FOR ELECTRIC POWER CONVERSION SYSTEM

(75) Inventors: Tsuneo Maebara, Nagoya (JP); Yoshiyuki Hamanaka, Kariya (JP)

(73) Assignee: Denso Corporation, Kariya (JP)

( * ) Notice: Subject to any disclaimer, the term of this patent is extended or adjusted under 35 U.S.C. 154(b) by 190 days.

(21) Appl. No.: 13/043,815

(22) Filed: Mar. 9, 2011

(65) Prior Publication Data

US 2011/0221374 A1 Sep. 15, 2011

(30) Foreign Application Priority Data

Mar. 11, 2010 (JP) .................................. 2010-54415

(51) Int. Cl.
*G05F 1/08* (2006.01)

(52) U.S. Cl. ........ 323/282; 323/265; 323/234; 323/274; 323/284; 318/139; 318/494; 318/123; 318/248; 318/492; 320/163; 320/166; 307/44; 307/45; 307/48; 307/109; 307/116

(58) Field of Classification Search .................. 318/494, 318/123, 248, 440, 492; 320/163, 166; 361/139; 307/44, 45, 48, 109, 116; 323/274, 284, 323/282, 265, 234

See application file for complete search history.

(56) References Cited

U.S. PATENT DOCUMENTS

| | | | | |
|---|---|---|---|---|
| 3,634,728 A | * | 1/1972 | Moury | 361/54 |
| 5,170,105 A | * | 12/1992 | Kumar | 318/362 |
| 6,798,175 B2 | * | 9/2004 | Hanada et al. | 320/166 |
| 7,622,898 B2 | * | 11/2009 | Shimizu et al. | 320/166 |
| 7,781,992 B2 | * | 8/2010 | Acker | 318/105 |
| 7,851,954 B2 | * | 12/2010 | Endo et al. | 310/68 D |
| 8,120,295 B2 | * | 2/2012 | Soma et al. | 318/376 |
| 2010/0244558 A1 | * | 9/2010 | Mitsutani et al. | 307/9.1 |
| 2011/0241589 A1 | * | 10/2011 | Danjo et al. | 318/453 |

FOREIGN PATENT DOCUMENTS

| | | |
|---|---|---|
| JP | 9-201065 | 7/1997 |
| JP | 2000-116143 | 4/2000 |
| JP | P2000-278802 A | 10/2000 |
| JP | 2008-061300 | 3/2008 |
| JP | 2009-232620 | 10/2009 |

OTHER PUBLICATIONS

U.S. Appl. No. 12/899,777, Junichi Fukuta et al., filed Oct. 7, 2010.
Japanese Office Action dated Dec. 13, 2011, issued in corresponding Japanese Application No. 2010-054415, with English translation.

* cited by examiner

*Primary Examiner* — Rita Leykin
(74) *Attorney, Agent, or Firm* — Nixon & Vanderhye PC

(57) ABSTRACT

A discharge control device in an electric power conversion system mounted to a motor vehicle turns off a relay in order to instruct an electric power conversion circuit to supply a reactive current into a motor generator, and thereby to decrease a capacitor voltage to a diagnostic voltage. After this process, the discharge control device outputs an emergency discharging instruction signal dis in order to turn on both power switching elements at high voltage side and a low voltage side in the electric power conversion circuit. This makes a short circuit between the electrodes of the capacitor in order to discharge the capacitor, and executes a discharging control to detect whether or not an emergency discharging control is correctly executed and completed. The discharge control device detects whether or not the electric power stored in the capacitor is discharged on the basis of the voltage of a voltage sensor.

12 Claims, 12 Drawing Sheets

Swp (U PHASE)

Swn (U PHASE)

CAPACITOR 16

FIG.4A  dis
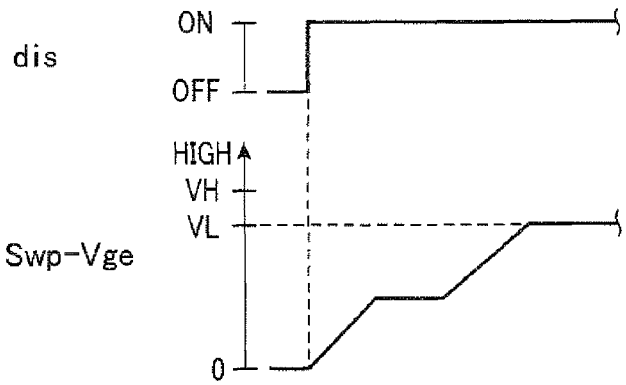
FIG.4B  Swp-Vge
FIG.4C  dis
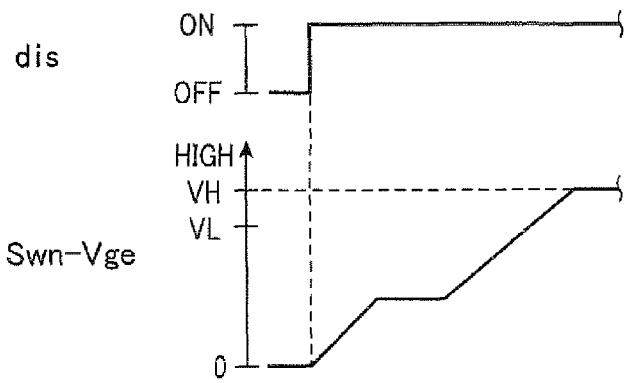
FIG.4D  Swn-Vge
FIG.5
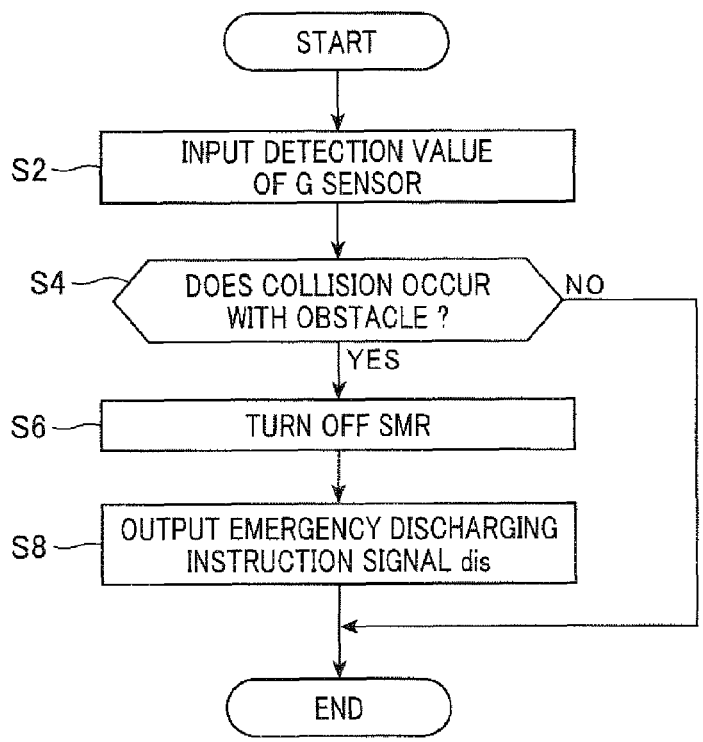

DISCHARGING CONTROL DEVICE FOR ELECTRIC POWER CONVERSION SYSTEM

CROSS-REFERENCE TO RELATED APPLICATION

This application is related to and claims priority from Japanese Patent Application No. 2010-054415 filed on Mar. 11, 2010, the contents of which are hereby incorporated by reference.

BACKGROUND OF THE INVENTION

1. Field of the Invention

The present invention relates to discharging control devices for electric power conversion systems comprised of a DC power source, an electric power conversion circuit, a capacitor, and an electrical switching means (or a switch open/close means), and the discharging control device having a discharging control means for adjusting a charged voltage of the capacitor to a voltage of not more than a predetermined voltage by controlling the electric power conversion circuit when the electrical switching means is turned off (namely, opened).

2. Description of the Related Art

Conventional techniques, for example, Japanese patent laid open publication No. JP 2009-232620 discloses a conventional discharging control device. Such a conventional discharging control device is applied to an electric power conversion system. In general, such an electric power conversion system is comprised of a DC power source, an electric power conversion circuit, a capacitor, and an electrical switching means. The electric power conversion circuit converts a direct current (DC) voltage of the DC power source to a predetermined an alternating current (AC) voltage. The capacitor is placed between the electric power conversion circuit and the DC power source. The electrical switching means opens and closes electrical connections (wires or paths) between the electric power conversion circuit and the capacitor. The discharging control device is comprised of a discharging control means capable of adjusting a charged voltage of the capacitor to a voltage of not more than a predetermined voltage by controlling the electric power conversion circuit when the electrical switching means is turned off, (namely, opened).

The above conventional discharging control device makes a short circuit between both electrodes of the capacitor connected to an input terminal of the electric power conversion circuit as an inverter by simultaneously turning on a power switching element at a high voltage side and a power switching element at a low voltage side in the inverter in order to discharge the electric power charged in the capacitor. In particular, this conventional discharging control device as one conventional technique decreases a gate voltage of an Insulated Gate Bipolar Transistor (IGBT) as the power switching element during the discharging control in order to avoid an excess current from flowing between the electrodes of the capacitor when a short circuit is made between the electrodes of the capacitor. This discharging control operation is different from the usual control operation of the inverter, By the way, the conventional discharging control device executes the above special discharging control operation by controlling the power switching elements and the capacitor. This special discharging control operation is different from the usual control operation. In other words, the usual control operation does not use the components of the electric power conversion system which are necessary to execute the special discharging control operation. Thus, the mechanism and components to be used for executing the usual control operation is different from the mechanism and components to be used for executing the special discharging control operation. Accordingly, to correctly drive the inverter comprised of the power switching elements and the capacitor during the usual control operation does not guarantee to correctly drive the inverter and the capacitor during the special discharging control operation of discharging the electric power charged in the capacitor. Therefore even if the usual control operation can be correctly executed and completed, there is a possibility that the special discharging control operation is not always executed correctly when receiving a request to execute the special discharging control.

SUMMARY OF THE INVENTION

It is an object of the present invention to provide a discharging control device equipped with a discharging control means which is applied to an electric power conversion circuit in an electric power conversion system. The discharging control device diagnoses or detects whether or not the discharging control means correctly executes the discharging control process. The discharging control means controls a charged voltage of a capacitor in the electric power conversion system to a voltage of not more than a predetermined voltage by controlling the components in the electric power conversion circuit.

To achieve the above purposes, the present invention provides a discharging control device which is applied to an electric power conversion system. The electric power conversion system is comprised of an electric power conversion circuit, a capacitor, an electrical switching means, a discharging control means and one or more series connection units.

The electric power conversion circuit converts a direct current (DC) power of a DC power source to a predetermined alternating current (AC) power. The capacitor is placed between the electric power conversion circuit and the DC power source. The electrical switching means opens and closes electrical connection (wires or paths) between the electric power conversion circuit and the capacitor. The discharging control means is comprised of a diagnostic means and controls the electric power conversion circuit in order to adjust a charged voltage of the capacitor to a voltage of not more than a predetermined voltage when the electrical switching means is turned off. The series connection unit in the electric power conversion circuit is connected in parallel to the capacitor. The series connection unit is comprised of a switching element at a high voltage side and a switching element at a low voltage side. The discharging control means, under the control by the discharging control device, makes a short circuit between both electrodes of the capacitor by turning on the switching element at a high voltage side and the switching element at a low voltage side in the series connection unit simultaneously.

The diagnostic means diagnoses whether or not the discharging control means correctly executes the discharging control by instructing the discharging control means to execute the discharging control after the electrical switching means is switched from its turned-on state to turned-off state in order to detect whether or not the capacitor actually discharges its charged electric power.

The discharging control device having the diagnostic means according to the present invention makes it possible to guarantee for the discharging control means to correctly execute the discharging control of the capacitor when the diagnostic result of the diagnostic means indicates that the discharging control such as an emergency discharging control can be correctly executed and completed.

The discharging control device as other aspect of the present invention further has a detection means. The detection means detects whether or not components of a system enter an abnormal state. For example, the electric power conversion system is mounted to the system such as a motor vehicle. The abnormal state of the system is an accident involving collision with an obstacle such as another motor vehicle. The discharging control means is an emergency discharging control means which (a) makes a short circuit between the electrodes of the capacitor by turning on the switching element at a high voltage side and the switching element at a low voltage side simultaneously when the detection result of the detection means indicates the occurrence of the abnormal state. The discharging control means further has an usual discharging control means which instructs (b) the capacitor to discharge its charged electric power without making any short circuit between the electrodes of the capacitor when the electrical switching means is turned off and the detection means does not indicate the occurrence of entering the abnormal state. The diagnostic means diagnoses whether or not the discharging control means correctly executes the discharging control by instructing the usual discharging control means in order to instruct the capacitor to perform the above operation (b), instead of instructing the emergency discharging control means as the discharging control means to execute the above operation (a) in order to diagnose whether or not the discharging control means correctly execute the discharging control.

When the emergency discharging control means discharges the electric power charged in the capacitor, there is a possibility that heat energy generated in the switching elements extremely increases. On the other hand, according to the present invention, the emergency discharging control means instructs the capacitor to discharge a part of the electric power charged in the capacitor. This makes it possible to decrease the entire quantity of heat energy generated in the switching elements while the discharging control of the capacitor is executed.

In the discharging control device as other aspect of the present invention, the diagnostic means instructs the emergency discharging control means to execute the discharging control so that the capacitor is discharged by the usual discharging control means when the electrical switching means is turned off.

In the discharging control to discharge electric power charged in the capacitor, the more the charged voltage of the capacitor is high, the more the discharged energy increases per voltage drop in the capacitor. When the emergency discharging control means executes the discharging control during a starting period of time thereof, the heat energy generated in the switching elements easily increases. On the other hand, according to the present invention, the emergency discharging control means is executed after the charged voltage of the capacitor is decreased to a voltage of not more than the predetermined voltage. This control makes it possible to decrease the heat energy generated in the switching elements during the discharging control.

In the discharging control device as other aspect of the present invention, the electric power conversion system is mounted to a motor vehicle. The electrical switching means is turned off when a starting switch of the motor vehicle is turned off. The starting switch is used for starting the motor vehicle. The usual discharging control means instructs the electrical switching means to be turned on in order to discharge the electric power charged in the capacitor to a predetermined voltage when the starting switch is turned off. Further, the diagnostic means instructs the emergency discharging control to execute the discharging control when the starting switch is turned on.

According to the present invention, because the diagnostic means executes the diagnostic process when the starting switch of the motor vehicle is turned on, it is possible for the emergency discharging control means to reliably execute the discharging control of the capacitor even if the electric power conversion circuit enters abnormal state during the usual operation.

Further, even if the discharging control device is turned off when the starting switch of the motor vehicle is turned off, it is possible for the discharging control device informs the diagnostic result to the outside such as a vehicle driver without storing the diagnostic result to the memory means such as non-volatile memory.

The discharging control device as other aspect of the present invention further has a means for discharging the electric power charged in the capacitor without making a short circuit between the electrodes of the capacitor. The diagnostic means diagnoses whether or not the emergency discharging control can be correctly executed and completed by instructing the discharging control means to turn off the electrical switching means in order to discharge a part of the electric power charged in the capacitor. When the diagnostic result indicates that the emergency discharging control is not correctly executed and completed, the diagnostic means instructs the means to discharge the electric power charged in the capacitor without making a short circuit between the electrodes of the capacitor.

According to the present invention, although the diagnostic result of the diagnostic means indicates the occurrence of error of the emergency discharging control, it is possible to reliably discharge the electric power charged in the capacitor.

In the discharging control device as other aspect of the present invention, the electric power conversion circuit comprises a direct current to alternating current (DC-AC) conversion circuit for converting a DC power stored in the DC power source to an AC power and supplying the AC power to the electric rotary machine. The usual discharging control means instructs the DC-AC conversion circuit to generate and supply a reactive current to the electric rotary machine in order to discharge the electric power charged in the capacitor.

In the discharging control device as other aspect of the present invention, the usual discharging control means is a resistance which is connected in parallel to the capacitor.

In the discharging control device as other aspect of the present invention, the electric power conversion system transmits an electric power between an on-vehicle main machine mounted on a motor vehicle and the DC power source. The electrical switching means is turned off when a starting switch of the motor vehicle is turned off. The discharging control means is turned off when the starting switch of the motor vehicle is turned off. The electric power conversion system further comprises a memory means for continuously storing data even if the discharging control means is turned off. The diagnostic means diagnoses whether or not the emergency discharging control can be correctly executed and completed after the electrical switching means is turned off when the starting switch is turned off. The diagnostic means stores the diagnostic result into the memory means.

In the case in which the diagnostic means executes the diagnostic operation when the starting switch is turned off, there is a possibility of deleting the diagnostic result when the discharging control device is turned off. On the other hand, according to the present invention, because the diagnostic result is written into and continuously stored in the memory means, it is possible to avoid the diagnostic result from being deleted.

In the discharging control device as other aspect of the present invention, the discharging control means is turned on and reads the data stored in the memory means when the starting switch is turned on. The discharging control means informs the diagnostic result to the outside (such as the vehicle driver) of the electric power conversion system when the data read from the memory means indicates that the emergency discharging control is not correctly executed and completed.

In the case in which the diagnostic means executes the diagnostic operation when the starting switch is turned off, there is a possibility for the vehicle driver is apart from the own motor vehicle when the diagnostic operation is completed. According to the present invention, the discharging control device reads the diagnostic result stored in the memory, and reliably informs the diagnostic result regarding the occurrence of error of the emergency discharging control to the vehicle driver when the vehicle driver turns on the starting switch.

In the discharging control device as other aspect of the present invention, each of the switching element at a high voltage side and the switching element at a low voltage side is a switching element of a voltage controlled type.

The discharging control means determines a voltage to be supplied to a conductive control terminal of at least one of the switching elements at the high and low voltage sides so that a current flowing in at least one of the switching elements in its unsaturated zone becomes smaller than a usual current to be supplied to the switching elements in the electric power conversion circuit in a usual operation.

Because the discharging control device is not used during the usual operation of the electric power conversion circuit, it is important to execute the discharging control means when the request to execute the discharging control is generated. On the other hand, according to the present invention, the diagnostic means detects whether or not the emergency discharging control can be correctly executed and completed. It is possible to guarantee the operation of the discharging control means when the diagnostic means provides the diagnostic result which indicates that the emergency discharging control is correctly executed and completed.

In the discharging control device as other aspect of the present invention, one of the switching element at a high voltage side and the switching element at a low voltage side is turned on, and the other switching element must be turned off when the electric power conversion circuit performs its usual operation.

According to the present invention, because the switching element at a high voltage side and the switching element at a low voltage side are not turned on simultaneously during their usual operation, the above switching elements are controlled by different control means during the usual control and the discharge control, respectively. Accordingly, it is important for the diagnostic means to diagnose whether or not the emergency discharging control can be correctly executed and completed.

In the discharging control device as other aspect of the present invention, the electric power conversion circuit comprises a DC-AC conversion circuit for converting a DC power of the DC power source to an AC power and supplies the AC power to the electric rotary machine. The electric power conversion circuit usually transmits the electric power between the electric rotary machine and the DC power source in order to drive the electric rotary machine.

BRIEF DESCRIPTION OF THE DRAWINGS

A preferred, non-limiting embodiment of the present invention will be described by way of example with reference to the accompanying drawings, in which:

FIG. 4A is a timing chart showing the transition state of the emergency discharging instruction signal dis for the power switching element Swp at the high voltage side in the U phase;

FIG. 4B is a timing chart showing the transition state of a gate-emitter voltage Vge of the power switching element Swp at the high voltage side during the emergency discharging control;

FIG. 4C is a timing chart showing the transition state of the emergency discharging instruction signal dis for the power switching element Swn at the low voltage side in the U phase during the emergency discharging control;

FIG. 4D is a timing chart showing the transition state of a gate-emitter voltage Vge of the power switching element Swn at the low voltage side during the emergency discharging control;

FIG. 5 is a flow chart showing the process of executing the emergency discharging control executed by the discharging control device according to the first embodiment;

DETAILED DESCRIPTION OF THE PREFERRED EMBODIMENTS

Figure 1:
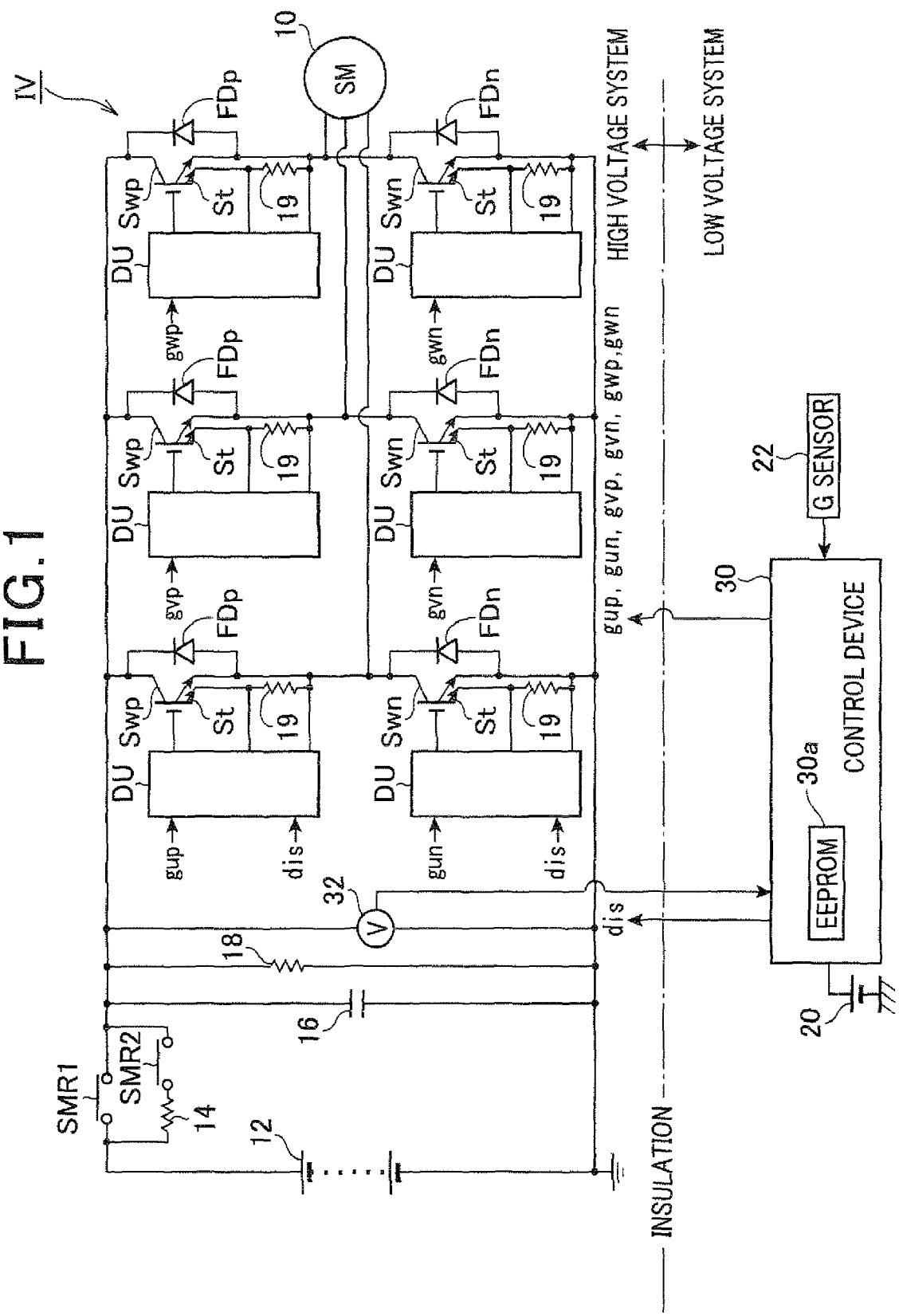
FIG. 1 is a view showing a system configuration of an electric power conversion system equipped with a discharging control device according to a first embodiment of the present invention.

Hereinafter, various embodiments of the present invention will be described with reference to the accompanying drawings. In the following description of the various embodiments, like reference characters or numerals designate like or equivalent component parts throughout the several diagrams. The following description will explain the embodiments according to the present invention in which the electric power conversion system equipped with the discharging control device is applied to a hybrid vehicle.

First Embodiment

A description will be given of a discharging control device according to a first embodiment of the present invention with reference to FIG. 1 to FIG. 8.

FIG. 1 is a view showing a system configuration of an electric power conversion system equipped with the discharging control device according to the first embodiment of the present invention. As shown in FIG. 1, a motor generator (or a synchronous motor) 10 is an on-vehicle main device. The motor generator is mounted to a hybrid motor vehicle (hereinafter, referred to the "motor vehicle") and is mechanically connected to the driving wheels of the motor vehicle. The motor generator 10 is connected to a high voltage battery 12 such as a direct current (DC) power source through an inverter IV (a voltage conversion circuit) and a unit. The unit is comprised of a relay SMR2, a resistance 14 and a relay SMR1. In the unit, the relay SMR 2 and the resistance 14 are connected in series, and the relay SMR1 and the group of the relay SMR 2 and the resistance are connected in parallel.

The high voltage battery 12 supplies a high voltage of not less than several hundred volts, for example. Input terminals of the inverter IV are connected to terminals, namely, a positive electrode terminal and a negative electrode terminal of the capacitor 16 and a discharging resistance 18. The capacitor 16 and the discharging resistance 18 are connected in parallel when observed from the high voltage battery 12 side.

The inverter IV as the electric power conversion device is comprised of three connection units which are connected in parallel. Each of the connection units is composed of a power switching element Swp at a high voltage side and a power switching element Swn at a low voltage side.

A connection node between the power switching element Swp at a high voltage side and the power switching element Swn at a low voltage side in each of the three connection units is connected to the corresponding phase terminal of the motor generator 10.

Further, the anode and cathode of a freewheel diode FDp are connected to the input and output (collector and emitter) terminals of the power switching element Swp at a high voltage side, respectively. The anode and cathode of a freewheel diode FDn are connected to the input and output (collector, emitter) terminals of the power switching element Swn at a low voltage side, respectively. Each of the power switching elements Swp and Swn is comprised of an insulated gate bipolar transistor (IGBT).

Each of the power switching elements Swp and Swn is equipped with a sense terminal St through which a small current is output. The value of the small current supplied through the sense terminal St indicates a correlation with a current flowing between the input terminal and the output terminal of the power switching element Swp and Swn.

The small current output through the sense terminal St flows through a shunt resistance 19. The voltage corresponding to the voltage drop at the shunt resistance 19 is supplied to the drive unit DU. This drive unit DU drives the power switching element Sw# (Swp, Swn, namely, "#"=p or n).

The drive unit DU forcedly instructs the corresponding power switching element Sw# to be turned off when the current flowing between the input terminal and the output terminal of the power switching element Sw# is not less than a predetermined threshold current Ith on the basis of the voltage drop in the shunt resistance 19.

On the other hand, the electric power conversion system has a control device 30 (as a discharging control device and a discharging control means). This control device 30 is an electric control device which receives electric power supplied from a low voltage battery 20.

The control device 30 is equipped with a read-only memory (ROM) unit such as a EEPROM 30a which is electrically rewritable. The control device 30 generates and outputs various operation signals and control values to the inverter IV in order to control the operation of the inverter IV and the motor generator 10. The motor generator 10 is a control target.

In more detail, the control device 30 generates and outputs operation signals gup, gyp and gwp and operation signals gun, gvn and gwn on the basis of detection results transferred from various current sensors (omitted from drawings). These operation signals gup, gyp and gwp are used for controlling the power switching elements Swp (#=p) of the inverter IV, which correspond to the U phase, V phase and W phase of the motor generator 10.

The operation signals gun, gvn and gwn are used for controlling the power switching elements Swn (#=n) in the U phase, V phase, and W phase of the inverter IV which correspond to the U phase, V phase and W phase of the motor generator 10.

The control device 30 controls the operation of the power switching elements Swp and Swn through the drive units DU. In each of the drive units DU is connected to a conductive control terminal (gate terminal) of the corresponding power switching element Sw# (#=p, n).

Further, the control device 30 in the electric power conversion system mounted to the motor vehicle receives a detection signal transferred from an acceleration detection means (for example, a Gravity sensor (G sensor) 22) and then detects occurrence of a collision with another vehicle or an obstacle on the basis of the detection value of the G sensor 22. The G sensor 22 as the acceleration detection means detects the acceleration of own motor vehicle on the basis of the force applied to own motor vehicle.

When detecting the occurrence of collision, the control device 30 generates and outputs an emergency discharging instruction signal dis to the power switching element Swp and Swn, which correspond to the U phase of the motor generator 10, through the corresponding drive unit DU.

By the way, as shown in FIG. 1, the high voltage system equipped with the inverter IV and the high voltage battery (as the DC power source) 12 is electrically insulated from the low voltage system having the control device 30 and the low voltage battery 20 through an insulation means such as an optical isolator or a photo coupler (omitted from drawings).

As previously described, the control device 16 placed in the low voltage system generates and outputs the operation signals g*# (*=u, v, w, and #=p, n, that is, the operation signals gup, gvn, gwp, gun, gun, gvn, gwn, etc.) and the emergency discharging instruction signal dis to the high voltage system side through the insulation means such as the optical isolator.

Figure 2:
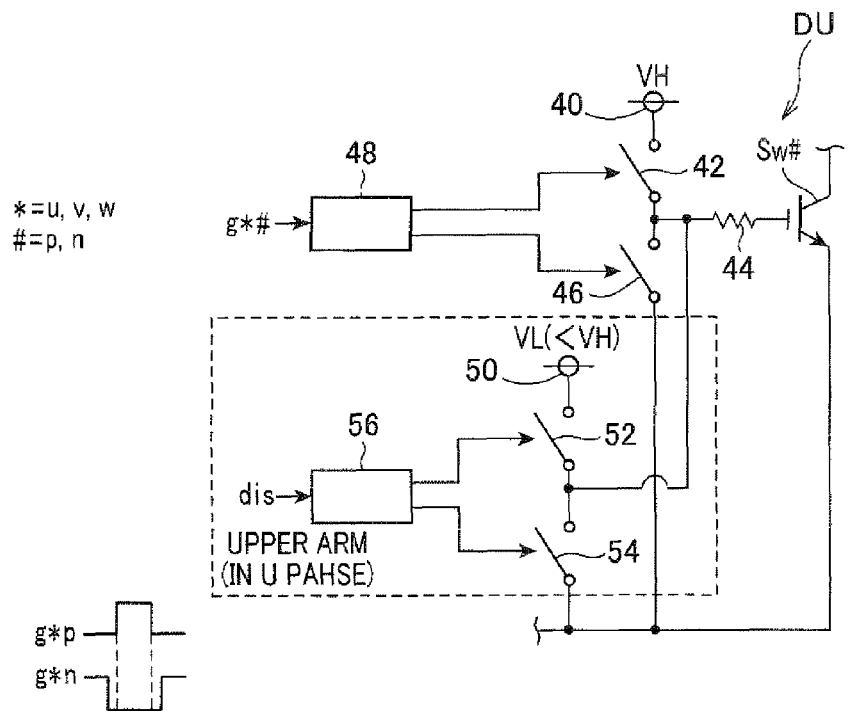
FIG. 2 is a view showing a configuration of a drive unit equipped with a drive circuit in the electric power conversion system shown in FIG. 1.

FIG. 2 is a view showing a configuration of the drive unit DU equipped with a drive unit for controlling the power switching element Sw# (*=u, v, w, and #=p, n) in the electric power conversion system shown in FIG. 1. In particular, FIG. 2 shows the configuration of a drive circuit which forms the drive unit DU. The drive circuit turns on and off the corresponding power switching elements Sw#.

As shown in FIG. 2, each of the drive units DU is equipped with a power source 40 having a terminal voltage VH. The voltage of the power source 40 is supplied to the conductive control terminal (gate terminal) of the power switching element Sw# through a charging switching element 42 and a gate resistance 44 of the power switching element Sw#.

Further, the gate terminal of the power switching element Sw# is connected to the output terminal (emitter) of the power switching element Sw# through the gate resistance 44 and the discharging switching element 46. This forms the discharging path of the gate terminal of the power switching element Sw#.

The charging switching element 42 and the discharging switching element 46 are turned on and off by a usual-operation drive control unit 48 which is used during the usual operation on the basis of the operation signals g*#. This makes it possible to turn on and off the power switching element Sw# by the usual-operation drive control unit 48 for the normal operation to be used during a normal state. These operation signals g*p and operation signals g*n (*=u, v and w) are complementary signals which are alternately turned on.

The drive unit DU at the upper arm of the U phase is further comprised of a drive circuit designated by the dotted line shown in FIG. 2. Accordingly, the voltage of a power source 50, which is lower than the terminal voltage VH of the power source 40, is supplied to the gate terminal of the power switching element Swp through the charging switching element 52 and the gate resistance 44.

Further, the gate terminal of the power switching element Swp is connected to the emitter of the power switching element Swp through the gate resistance 44 and the charging switching element 54. The charging switching element 52 and the discharging switching element 54 are turned on and off on the basis of the emergency discharging instruction signal dis. This makes it possible to turn on and off the power switching element Swp on the basis of the emergency discharging instruction signal dis.

The drive unit DU in the lower arm of the U phase has the function to instruct the switching element Swn to be turned on and off on the basis of the emergency discharging instruction signal dis. In this case, the gate voltage to be applied to the gate terminal of the power switching element Swn is equal to the terminal voltage VH of the power source 40. For example, this condition can be achieved by using a power source having the terminal voltage VH instead of the power source 50. It is also possible to incorporate an OR circuit to the usual-operation drive control unit 48 which is used during the usual operation. The OR circuit inputs a signal indicating the logical disjunction between the operation signal gun and the emergency discharging instruction signal dis.

Still further, it is acceptable to combine the signal transmission line of the emergency discharging instruction signal dis at the lower arm of the U phase and the transmission signal line of the operation signal gun. Although the emergency discharging instruction signal dis takes a different value between the power switching element Swp at a high voltage side and the power switching element Swn at a low voltage side. However, these emergency discharging instruction signals are designated by the same reference character through the description.

Figure 3A:
FIG. 3A is a timing chart showing the transition state of a power switching element at a high voltage side in the U phase of the electric rotary machine in the electric power conversion system during an emergency discharging control.
Figure 3B:
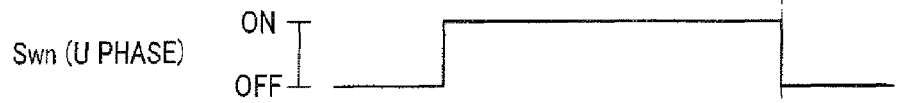
FIG. 3B is a timing chart showing the transition state of a power switching element at a low voltage side for the U phase of the electric rotary machine in the electric power conversion system during the emergency discharging control.
Figure 3C:
FIG. 3C is a timing chart showing the transition state of charged voltage of a capacitor in the electric power conversion system during the emergency discharging control.

FIG. 3A, FIG. 3B and FIG. 3C are timing charts which show the emergency discharging control executed by the control device 30 as the discharging control device according to the first embodiment when an emergency occurs in the own motor vehicle (not shown), for example, when the own motor vehicle collides with an obstacle such as another motor vehicle. In particular, FIG. 3A is a timing chart showing the transition state of the power switching element Swp in the high voltage side of the U phase. FIG. 3B is a timing chart showing the transition state of the power switching element Swn in the low voltage side of the U phase. FIG. 3C is a timing chart showing the transition state of charged voltage of the capacitor 16.

As shown in FIG. 3A, FIG. 3B and FIG. 3C according to the first embodiment, the power switching element Swp at the high voltage side is periodically turned on and off while the power switching element Swn at the low voltage side of the U phase is maintained in the turned-on state. This makes it possible to obtain the period in which the power switching element Swp at a high voltage side and the power switching element Swn at a low voltage side are simultaneously turned on. The electric power charged in the capacitor 16 can be discharged by making a short circuit between the electrodes of the capacitor 16 through the power switching element Swp at a high voltage side and the power switching element Swn at a low voltage side during this period.

Because the drive unit DU has the circuit configuration shown in FIG. 2, as previously described, the gate voltage to be supplied to the gate terminal of the power switching element Swp at a high voltage side becomes lower than the gate voltage to be applied to the gate terminal of the power switching element Swn at a low voltage side, as shown in following FIG. 4A to FIG. 4D.

FIG. 4A is a timing chart showing the transition state of the emergency discharging instruction signal dis for the power switching element Swp at a high voltage side in the U phase. FIG. 4B is a timing chart showing the transition state of a gate-emitter voltage Vge of the power switching element Swp at a high voltage side. FIG. 4C is a timing chart showing the transition state of the emergency discharging instruction signal dis for the power switching element Swn at a low voltage side in the U phase. FIG. 4D is a timing chart showing the transition state of a gate-emitter voltage Vge of the power switching element Swn at a low voltage side.

Accordingly, the power switching element Swp at a high voltage side can be driven in its unsaturated zone. On the other hand, the power switching element Swn at a low voltage side can be driven in its saturated zone. This means that a current flowing in the power switching element Swp at a high voltage side becomes smaller than that flowing in the power switching element Swn at a low voltage side because the gate voltage to be supplied to the gate terminal of the power switching element Swp at a high voltage side is set to a lower voltage value than the gate voltage to be supplied to the power switching element Swn at a low voltage side.

This makes it possible for the discharging control to limit the current flowing in the power switching element Swp at a high voltage side and the power switching element Swn at a low voltage side by the current flowing in the power switching element Swp at a high voltage side in its unsaturated zone.

In addition, it is possible to limit the current flowing in the power switching element Swp at a high voltage side and the current flowing in the power switching element Swn at a low voltage side by limiting one turned-on period of the power switching element Swp at a high voltage side. By the way, this limitation of one turned-on period of the power switching element Swp at a high voltage side can be obtained by repeatedly turning on and off many times the power switching element Swp at a high voltage side.

It is preferable to set a value of less than a threshold value Ith determined by the drive unit DU to the current flowing in the power switching element Swp at a high voltage side in its unsaturated zone. The terminal voltage VH of the power source 40 is determined so that the threshold current Ith corresponds to the saturated zone. That is, when the motor generator 10 is controlled by using the control values, the power switching element Swp at a high voltage side and the power switching element Swn at a low voltage side are driven during their saturated zone.

FIG. 5 is a flow chart showing the process of executing the emergency discharging control by the control device 30 as the discharging control device according to the first embodiment.

The control device 30 according to the first embodiment repeatedly executes the process of executing the discharging control shown in FIG. 5.

In the process of executing the emergency discharging control shown in FIG. 5, the control device 30 inputs a detection signal which indicates a detection value detected by the G sensor 22 in step S2.

In step S4, the control device 30 detects whether or not the own motor vehicle (not shown) collides with an obstacle such as another motor vehicle on the basis of the detection signal transferred from the G sensor 22. The control device 30 detects the occurrence of a collision when the detected acceleration value obtained from the detection signal of the G sensor 22 is not less than a predetermined value.

When the detection result in step S4 indicates that the own motor vehicle collides with an obstacle ("YES" in step S4), the operation flow goes to step S6. In step S6, the control device 30 instructs the relay SMR1 and the relay SMR2 to be turned off (namely, opened).

The operation flow then goes to step S8. In step S8, the control device 30 generates and outputs the emergency discharging instruction signal dis to the drive unit DU in the inverter IV.

After the completion of step S8 or when the detection result in step S2 indicates the negation ("NO" in step S2), the control device 30 completes the discharging control shown in FIG. 5.

In particular, the control device 30 does not execute the emergency discharging control shown in FIG. 5 unless the own motor vehicle collides with an obstacle such as another motor vehicle.

Further, whether or not the emergency discharging control shown in FIG. 5 is correctly executed and completed does not depend on the condition whether or not the control device 30 usually controls the motor generator 10. This means that the emergency discharging instruction signal dis is different from the operation signals gup and gun, and the configuration of the drive circuit in the drive unit DU shown in FIG. 2 for executing the emergency discharging control is different from the configuration of the drive unit DU for controlling the motor generator 10 on the basis of the control values.

In the first embodiment, after the relay SMR1 is turned off (namely, opened), the emergency discharging control is executed. In this case, the control device 30 detects whether or not the voltage of the capacitor 16 is decreased on the basis of the voltage value obtained from the voltage sensor 32. This makes it possible for the control device 30 (as the discharging control device and the diagnostic means) to detect whether or not the emergency discharging control can be correctly executed and completed.

Figure 6A:
FIG. 6A is a timing chart showing the transition of the operation state of the relay SMR1.
Figure 6B:
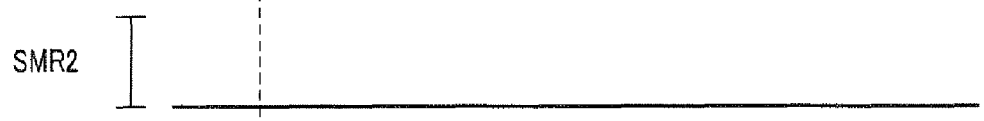
FIG. 6B is a timing chart showing the transition of the operation state of the relay SMR2.
Figure 6C:
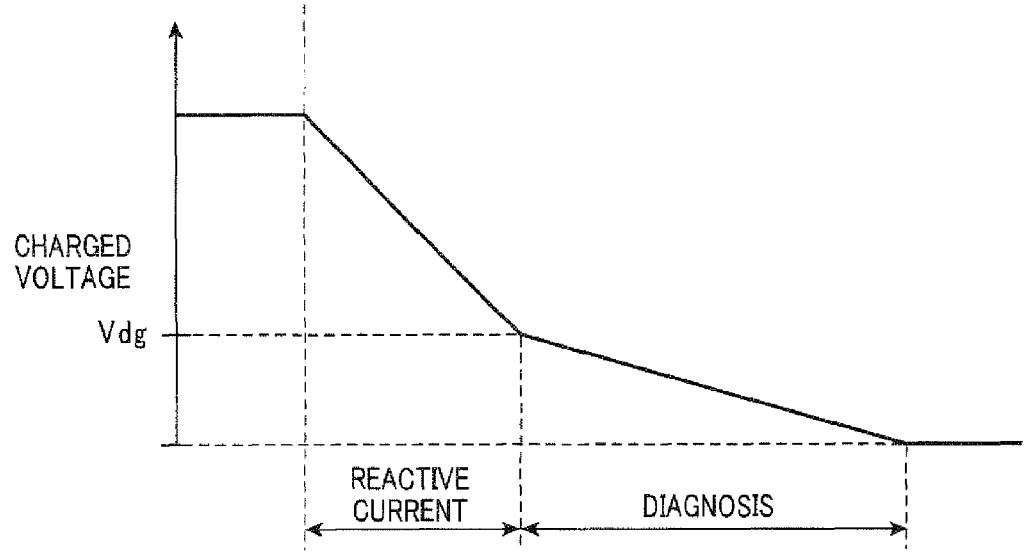
FIG. 6C is a timing chart showing the transition of the charged voltage of the capacitor 16.

Specifically, as shown in the timing charts of FIG. 6A, FIG. 6B and FIG. 6C, the control device 30 detects whether or not the emergency discharging control can be correctly executed and completed.

FIG. 6A is a timing chart showing the transition of the operation state of the relay SMR1. FIG. 6B is a timing chart showing the transition of the operation state of the relay SMR2. FIG. 6C is a timing chart showing the transition of the charged voltage of the capacitor 16.

As shown in FIG. 6A, FIG. 6B and FIG. 6C, after the relay SMR1 is turned off (namely, opened), the control device 30 instructs the inverter IV to generate and supply a reactive current into the motor generator 10 in order to decrease the charged voltage of the capacitor 16 to the diagnosing voltage Vdg. This diagnosing voltage Vdg is lower than the terminal voltage of the high voltage battery 12. After this process, the control device 30 executes the emergency discharging control shown in FIG. 5 in order to detect whether or not the emergency (or abnormal state) such as a collision with an obstacle occurs.

This makes it possible to suppress the total heat energy generated in the power switching elements Swp and Swn from increasing during the emergency discharging control, and to correctly execute the process of diagnosing whether or not the emergency discharging control can be correctly executed and completed.

Further, it is possible to rapidly discharge the electric power charged in the capacitor 16 by supplying the reactive current into the motor generator 10 when compared with the discharge of the electric power from the capacitor 16 through the discharging resistance 18.

The discharging resistance 18 is used when the capacitor 16 is charged by the motor generator 10 which enters the electric-power generation state by the own motor vehicle, for example, when the own motor vehicle drives downward on a slope.

Figure 7:
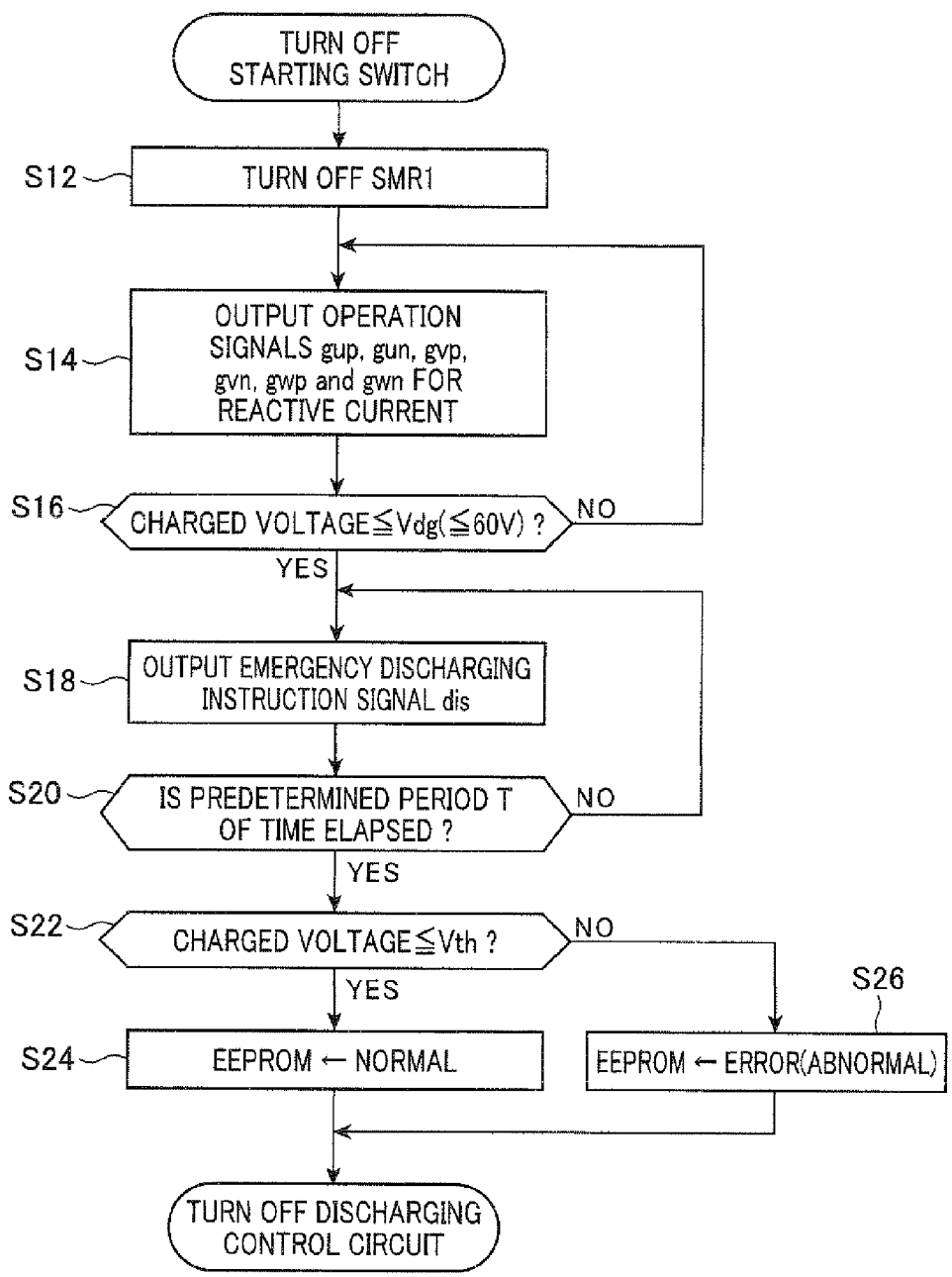
FIG. 7 is a flow chart showing the diagnosing process of detecting whether or not the emergency discharging control can be correctly executed and completed.

FIG. 7 is a flow chart showing the diagnosing process of detecting whether or not the emergency discharging control can be correctly executed and completed.

The control device 30 as the discharging control device starts to execute the diagnosing process shown in FIG. 7 when the vehicle driver turns off the starting switch of the own motor vehicle. The starting switch is the means to start the own motor vehicle when the vehicle driver wants to start the engine of the own motor vehicle. It is possible for the starting switch to be a mechanical switch or a wireless device for generating an engine-start instruction signal to a wireless receiver mounted on the own motor vehicle.

When the vehicle driver turns off the starting switch, the control device 30 turns off the electric power source after completion of the execution of the series of steps shown in FIG. 7. When the electric power source is turned off, various data items stored in a volatile memory (not shown) incorporated in the control device 30 are deleted or released.

In the steps shown in FIG. 7, the control device 30 turns off (namely, opened) the relay SMR1 when the starting switch is turned off.

In step S14, the control device 30 generates and outputs the operation signals g*# to the switching elements Sw# in order to supply the reactive current into the motor generator 10. For example, when the motor generator 10 is an IPMSM (Interior Permanent Magnet Synchronous Motor) or a SPM (Surface Permanent Magnet motor), it is sufficient for the control device 30 to generate the operation signal g*# so that a q-axis current has zero, and the absolute value of a d-axis current becomes larger than zero. The control device 30 continues this control until the charged voltage of the capacitor 16 reaches or becomes less than the diagnosing voltage Vdg (step S16).

The control device 30 according to the first embodiment uses the diagnosing voltage Vdg of not more than 60 Volts. Setting the diagnosing voltage Vd to 60 Volts or less can avoid the vehicle driver from entering dangerous state by the charged voltage of the capacitor 16.

When the charged voltage of the capacitor 16 is decreased to the diagnosing voltage Vd, the control device 30 generates and outputs the emergency discharging instruction signal dis in step S18. The operation flow goes to step S20. In step S20, the control device 30 detects whether or not a predetermined period of time T is elapsed.

The detection result in step S20 indicates the predetermined period T of time is already elapsed ("YES" in step S20), the operation flow forwards to step S22.

In step S22, the control device 30 detects whether or not the charged voltage of the capacitor 16 is not more than the threshold voltage Vth (<Vdg). This threshold voltage Vth is determined in advance so that the charge voltage of the capacitor 16 reliably reaches the threshold voltage Vth when the emergency discharging control is executed during the predetermined period T of time.

When the detection result in step S22 indicates that the charged voltage of the capacitor 16 is not more than the threshold voltage Vth (<Vdg) ("YES" in step S22), the operation flow goes to step S24. In step S24, The control device 30 stores a first value into the EEPROM 30a. The first value indicates that the discharging control is in the normal state.

On the other hand, when the detection result in step S22 indicates that the charged voltage of the capacitor 16 is more than the threshold voltage Vth Vdg) ("NO" in step S22), the operation flow goes to step S26. In step S26, the control device 30 stores a second into the EEPROM 30a. The second value indicates that the emergency discharging control is in the error (abnormal) state, namely, is not correctly executed and completed.

After the completion of the step 24 or the step S26, the control device 30 completes the series of steps shown in FIG. 7.

Figure 8:
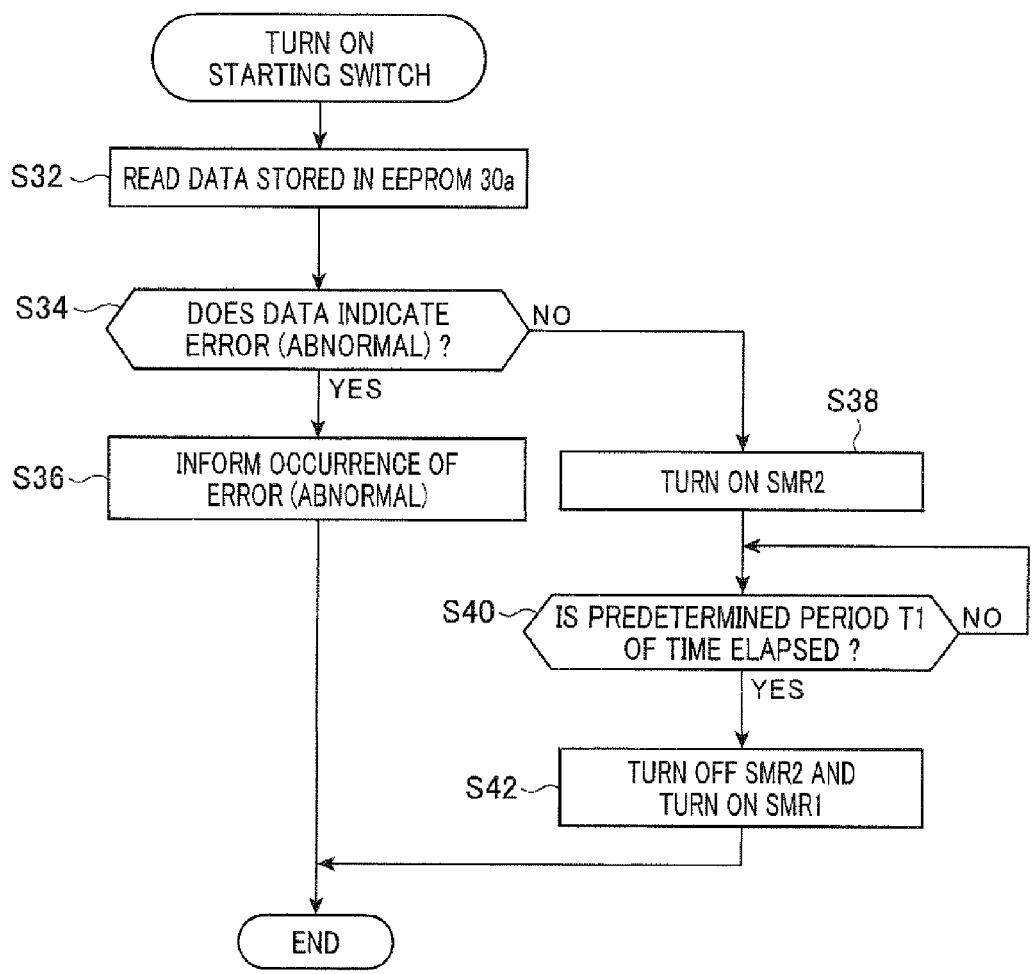
FIG. 8 is a flow chart showing the process of informing the diagnostic result obtained by the discharging control device according to the first embodiment.

FIG. 8 is a flow chart showing the process of informing the diagnostic result obtained by the discharging control device according to the first embodiment. That is, the control device 30 starts to execute the process shown in FIG. 8 when the vehicle driver turns on the starting switch.

In step S32, the control device 30 reads the data as the diagnosing result stored in the EEPROM 30a, which is stored in the previous diagnostic process when the vehicle driver turns off the starting switch.

In step S34, when the previous diagnosing result indicates the error (abnormal) state of the previous emergency discharging control ("YES" in step S34), the operation flow goes to step S36. In step S36, the control device 30 informs the occurrence of error of the emergency discharging control to the vehicle driver through a display unit (not shown), for example.

On the other hand, when the previous diagnosing result indicates the normal state of the discharging control ("NO" in step S34), the operation flow goes to step S38. In step S38, the control device 30 instructs the relay SMR2 to be turned on (closed) in order to connect the high voltage battery 12 with the capacitor 16 through a high voltage electric path or wire during a predetermined period T1 of time (step S40). The control device 30 sets a value to this predetermined period T1 of time The value is longer than a predetermined period of time which is necessary for the charged voltage of the capacitor 16 to reach the terminal voltage of the high voltage battery 12.

After the predetermined period T1 of time is elapsed, the operation flow goes to step S42. In step S42, the control device 30 instructs the relay SMR2 to be turned off (namely, opened) and the relay SMR1 to be turned on (closed) in order to connect the high voltage battery 12 with the capacitor 16 through the low resistance electrical connection.

The control device 30 according to the first embodiment completes the series of steps shown in FIG. 8 when the execution of step S36 or step S42 is completed.

As described above in detail, the control device 30 as the discharging control device according to the first embodiment ha the following effects.

(1) A reactive current is supplied into the motor generator 10 by turning off (namely, opened) the relay SMR1. After the charged voltage of the capacitor 16 is decreased to the diagnosing voltage Vdg, the control device 30 executes the emergency discharging control in order to detect whether or not the emergency discharging control can be correctly executed and completed. This makes it possible to decrease the heat energy generated in the power switching elements Swp, Swn by the emergency discharging control.

(2) The diagnosing result regarding whether or not the emergency discharging control can be correctly executed and completed is stored in the EEPROM 60a as the memory means. When the vehicle driver turns on the starting switch, the control device 30 reads the diagnosing result stored in the EEPROM 60a, and informs the diagnosing result to the vehicle driver. This makes it possible to reliably inform the diagnosing result. The vehicle driver can thereby reliably recognize the occurrence of error of the emergency discharging control.

(3) The gate voltage supplied to the gate terminal of the power switching element Swp at a high voltage side is set so that a first current flowing in the power switching element Swp becomes smaller than a second current flowing in the power switching element Swp. The first current is the current flowing in the power switching element Swp at a high voltage side in the unsaturated zone when the motor generator 10 is controlled by using the control values. The second current is the current flowing in the power switching element Swp at the high voltage side in its unsaturated zone when the control device 30 executes the emergency discharging control.

This makes it possible for the different drive means to control the power switching elements Swp when (a1) the motor generator 10 is controlled by using the control values and (a2) the emergency discharging control is executed. This makes it possible to reliably diagnose the special circuit mechanism (for example, shown in FIG. 2) capable of executing the emergency discharging control.

(4) The emergency discharging control is executed by repeatedly executing the turning on-off operation of the power switching element Swp by intermittently supplying the low voltage (terminal voltage VL) of the gate terminal of the power switching element Swp while the high voltage (terminal voltage VH) is applied to the gate terminal of the power switching element Swn at a low voltage side. This makes it possible to stable the voltage between the gate and the emitter of the power switching element Swp which is repeatedly turned on and off. It is therefore possible to stably and correctly execute the emergency discharging control.

Second Embodiment

A description will be given of the process of diagnosing whether or not the emergency discharging control can be correctly executed and completed under the control of the control device as the discharging control device according to the second embodiment of the present invention with reference to FIG. 9.

The difference in the diagnostic process between the second embodiment and the first embodiment will be explained below with reference to FIG. 9.

Figure 9:
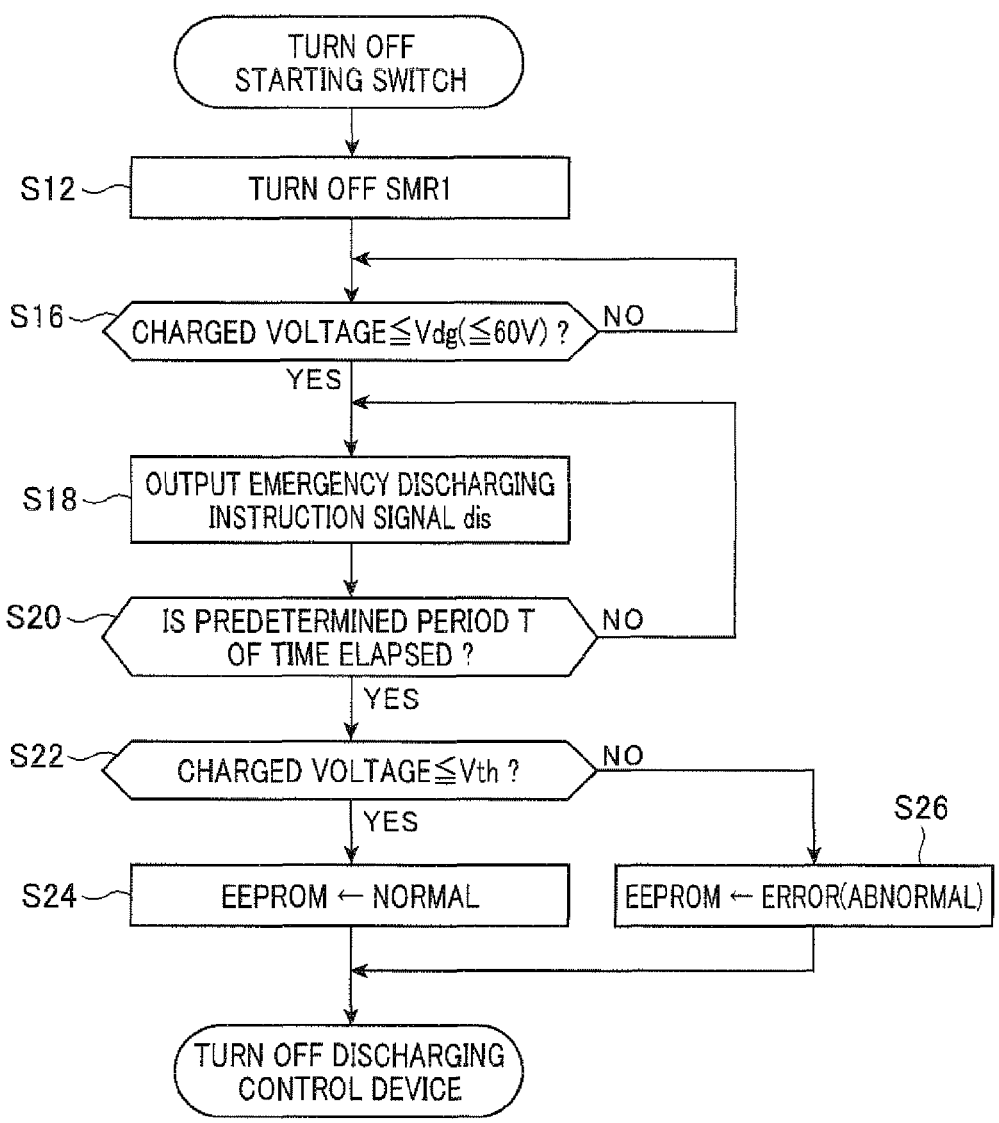
FIG. 9 is a flow chart showing the process of diagnosing whether or not the emergency discharging control can be correctly executed and completed according to a second embodiment of the present invention.

FIG. 9 is a flow chart showing the process of diagnosing whether or not the emergency discharging control can be correctly executed and completed according to the second embodiment of the present invention.

The same steps between the processes shown in FIG. 9 and FIG. 7 will be designated with the same step numbers.

As shown in FIG. 9, the control device 30 instructs the relay SMR1 to be turned off (namely, opened) in step S12. The operation flow goes to step S16. In step S16, the control device 30 instructs the capacitor 16 to discharge its electric power through the discharging resistance 18 until the charged voltage of the capacitor 16 reaches or becomes less than the diagnosing voltage Vdg. Thus, the diagnostic process according to the second embodiment has the same effects of the diagnostic process according to the first embodiment.

Third Embodiment

A description will be given of the process of discharging whether or not the emergency discharging control can be correctly executed and completed and completed under the control of the control device as the discharging control device according to the third embodiment of the present invention with reference to FIG. 10.

Figure 10:
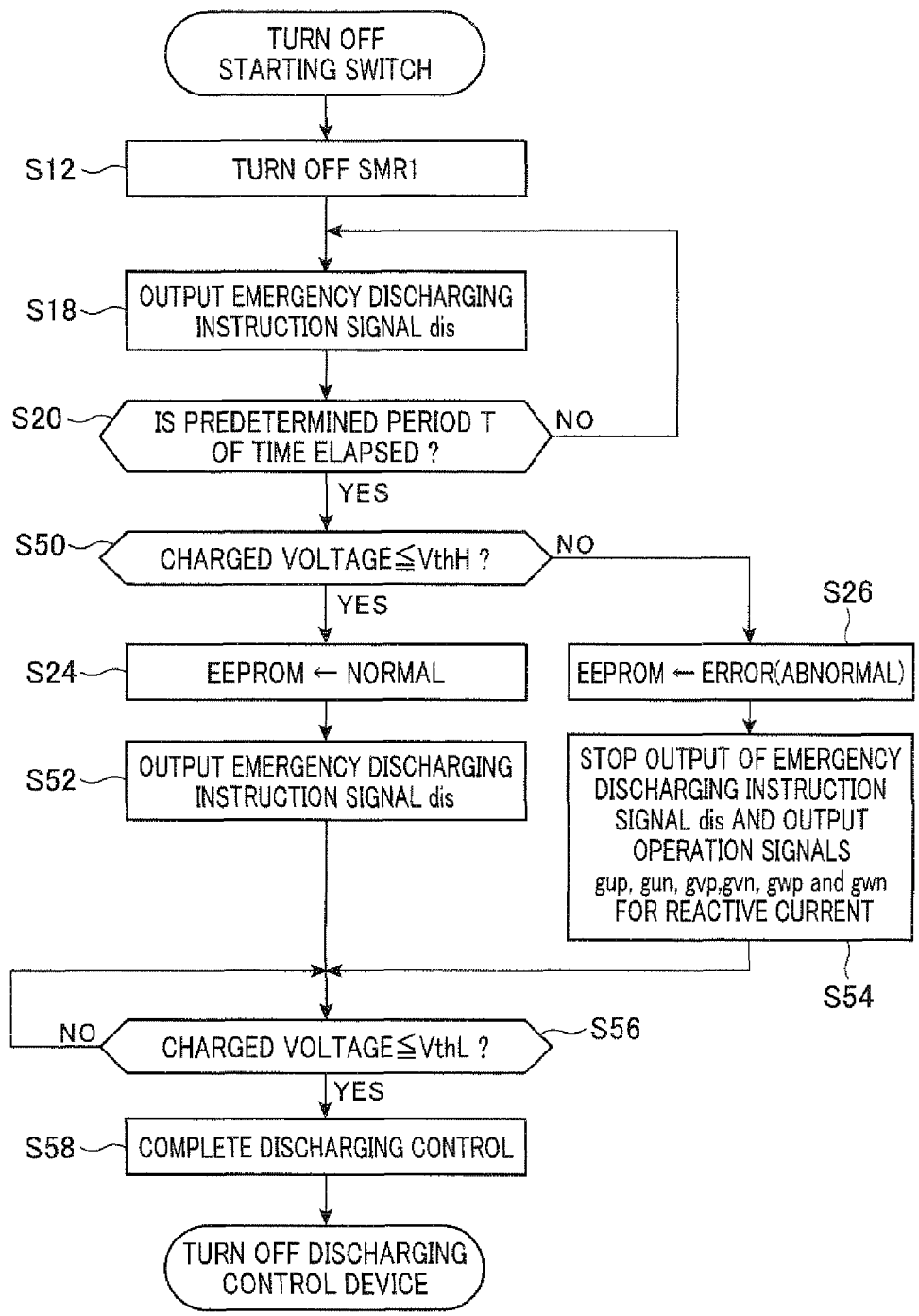
FIG. 10 is a flow chart showing the diagnosing process of detecting whether or not the emergency discharging control can be correctly executed and completed according to a third embodiment of the present invention.

FIG. 10 is a flow chart showing the diagnosing process of detecting whether or not the emergency discharging control can be correctly executed and completed according to the third embodiment of the present invention.

The difference in the discharging control between the third embodiment and the first embodiment will be explained below with reference to FIG. 10. The same steps between the processes shown in FIG. 10 and FIG. 7 will be designated with the same step numbers.

In the process shown in FIG. 10, the control device 30 instructs the relay SMR1 to be turned off (namely, opened) in step S12. In step S18, the control device 30 generates and outputs the emergency discharging instruction signal dis. After the predetermined period of time is elapsed ("YES" in step S12), the operation flow goes to step S50.

In step S50, the control device detects whether or not the charged voltage of the capacitor 16 is not more than a first threshold voltage VthH.

The first threshold voltage VthH is a voltage which is lower than the minimum voltage of the high voltage battery 12 and is not less than the maximum voltage of the capacitor 16 when the emergency discharging control is correctly executed and completed during the predetermined period T of time.

When the detection result in step S50 indicated that the charged voltage of the capacitor 16 is not more than the first threshold voltage VthH ("YES" in step S50), the operation flow goes to step S24. In step S24, the control device 30 stores the detection result which indicates that the emergency discharging control is correctly executed and completed into the EEPROM 30a.

On the other hand, when the detection result in step S50 indicated that the charged voltage of the capacitor 16 exceeds, namely, is more than the first threshold voltage VthH ("NO" in step S50), the operation flow goes to step S26. In step S26, the control device 30 stores the detection result which indicates that the emergency discharging control is not correctly executed and completed into the EEPROM 30a.

The operation flow goes to step S52 after completion of the process shown in step S24. In step S52, the control device 30 continues to output the emergency discharging instruction signal dis.

On the other hand, the operation flow goes to step S54 after completion of the process shown in step S26. In step S54, the control device 30 outputs the emergency discharging instruction signal dis, and outputs the operation signals gup, gun, gyp, gvn, gwp and gwn to the inverter IV in order to flow the reactive current in the motor generator 10. This makes it possible to discharge the electric power charged in the capacitor 16.

When the charged voltage of the capacitor 16 becomes not more than a second threshold voltage VthL ("YES" in step S56), the operation flow goes to step S58. In step S58, the control device 30 completes the discharging process shown in FIG. 10. In the third embodiment, the second threshold voltage VthL is lower than the diagnosing voltage Vdg.

As described above in detail, the third embodiment has the following additional effect (5) in addition to the effects (2), (3) and (4) previously described.

(5) When it is detected that the emergency discharging control is not correctly executed and completed, the control device 30 instructs the inverter IV to flow the reactive current in the motor generator 10 in order to discharge the electric power charged in the capacitor 16. This makes it possible to reliably discharge the electric power of the capacitor 16 even if the emergency discharging control can be correctly executed.

Fourth Embodiment

A description will be given of the electric power conversion system according to the fourth embodiment with reference to FIG. 11, FIG. 12 and FIG. 13.

Figure 11:
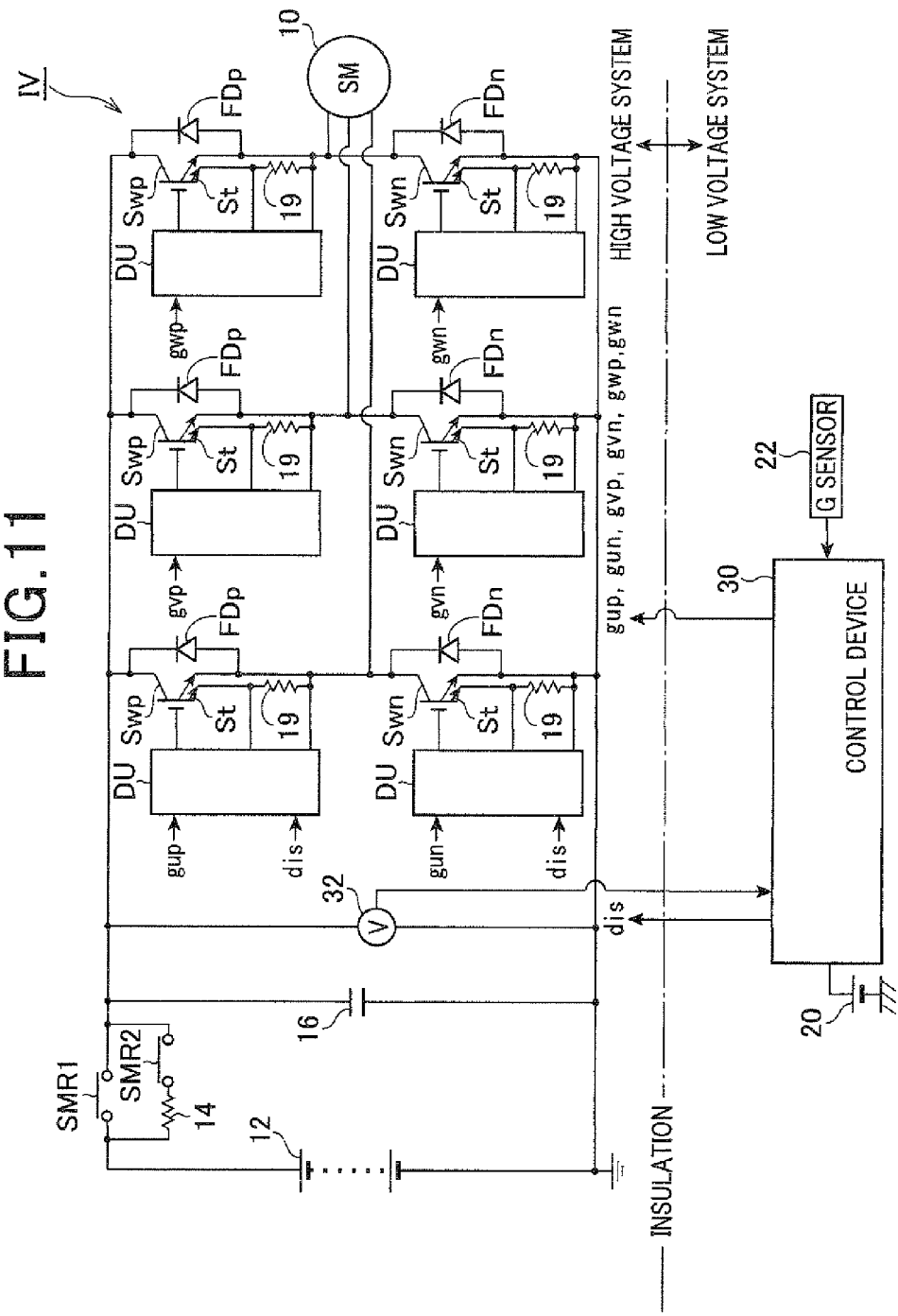
FIG. 11 is a view showing a system configuration of a electric power conversion system equipped with a discharging control device according to a fourth embodiment of the present invention.

FIG. 11 is a view showing a system configuration of the electric power conversion system equipped with the discharging control device according to the fourth embodiment of the present invention. The difference in the electric power conversion system between the fourth embodiment and the first embodiment will be explained below with reference to FIG. 11. The same components between the processes shown in FIG. 11 and FIG. 1 will be designated with the same step numbers.

As shown in FIG. 11, the electric power conversion system according to the fourth embodiment is not equipped with the discharging resistance 18. In other words, the discharging resistance 18 is eliminated from the configuration of the electric power conversion system shown in FIG. 1. Further, the control device 30 does not use a memory means such as the EEPROM 30a.

The configuration of the electric power conversion system according to the fourth embodiment does not have any means for discharging the electric power charged in the capacitor 16 through the power switching elements Swp and Swn in the inverter IV (as the electric power conversion device) while the relay SMR1 and the relay SMR2 are turned off (namely, opened).

Figure 12:
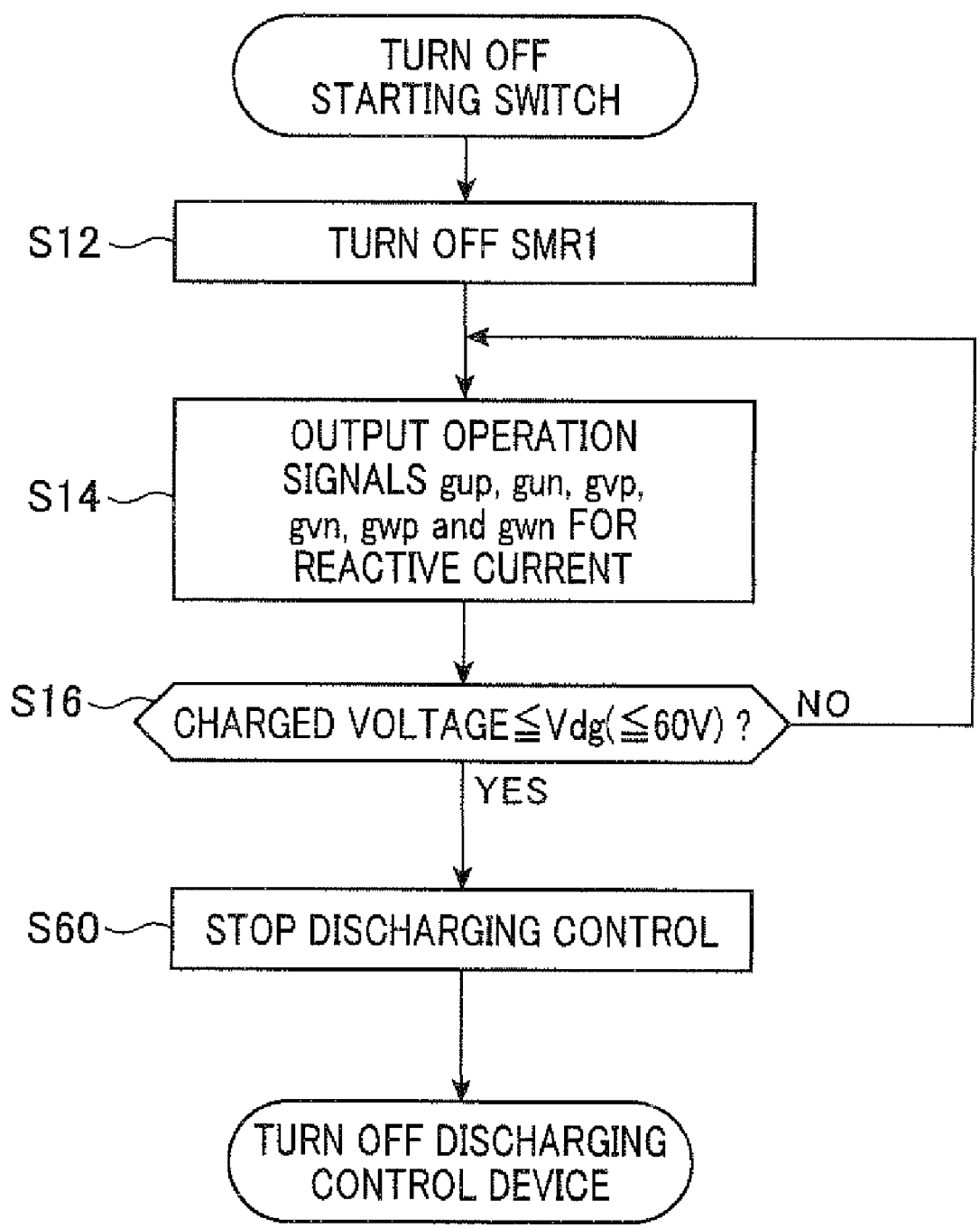
FIG. 12 is a flow chart showing a pre-process before the diagnosis for the emergency discharging control shown in the following FIG. 13 according to the fourth embodiment.

FIG. 12 is a flow chart showing a pre-process before the diagnosis for the emergency discharging control shown in the following FIG. 13 according to the fourth embodiment. The process shown in FIG. 12 is executed by the control device 30 when the vehicle driver turns off the starting switch (omitted from drawings).

The same steps between the flow charts shown in FIG. 12 and FIG. 7 are designated by the same step numbers.

In step S12 shown in FIG. 12, the relay SMR1 and the relay SMR2 are turned off (namely, opened).

In step S14, the control device 30 generates and outputs the operation signals gup, gun, gyp, gvn, gwp and gwn to the inverter IV in order to flow the reactive current in the motor generator 10. This makes it possible to discharge the electric power charged in the capacitor 16. That is, the electric power charged in the capacitor 16 is discharged by supplying the reactive current in the motor generator 10. When the voltage of the capacitor 16 becomes not more than the diagnostic voltage Vdg, the process of discharging the electric power charged in the capacitor 16 is stopped (step S60).

The operation of the control device 30 is stopped after completion of the step of discharging the electric power charged in the capacitor 16 in step S60.

Figure 13:
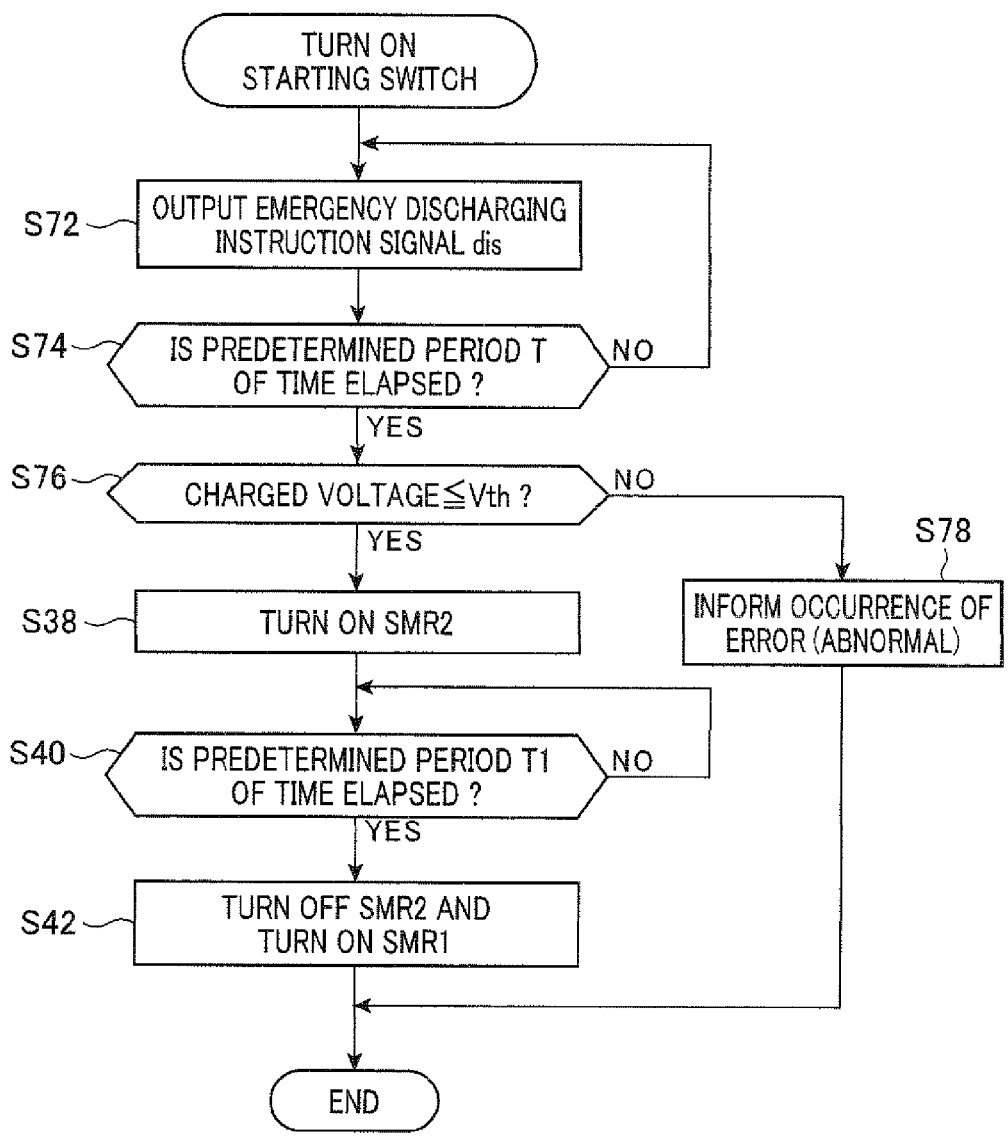
FIG. 13 is a flow chart showing another process of diagnosing whether or not the emergency discharging control can be correctly executed and completed according to the fourth embodiment.

FIG. 13 is a flow chart showing the process of diagnosing whether or not the emergency discharging control can be correctly executed and completed according to the fourth embodiment.

The process shown in FIG. 13 is also executed by the control device 30 when the vehicle driver turns off the starting switch (omitted from drawings). The same steps between the flow charts shown in FIG. 13 and FIG. 8 are designated by the same step numbers.

In step S72, the control device 30 generates and outputs the emergency discharging instruction signal dis. At this timing, the charged voltage of the capacitor 16 becomes the diagnostic voltage Vdg which is obtained by the pre-process shown in FIG. 12. Accordingly, it is possible to detect whether or not the capacitor 16 is already discharged.

After the predetermined period of time is elapsed ("YES" in step S74), it is detected whether or not the voltage of the capacitor 16 is not more than the threshold voltage Vth in step S76.

The fourth embodiment has the same relationship between the threshold voltage Vth and the predetermined period T of time disclosed in the first embodiment.

When the detection result in step S76 indicates that the charged voltage of the capacitor 16 exceeds (more than) the threshold voltage Vth ("NO" in step S76), the operation flow goes to step S78. In step S78, the control device 30 informs the occurrence of error of the emergency discharging control to the vehicle driver.

On the other hand, when the detection result in step S76 indicates that the charged voltage of the capacitor 16 does not exceed (is not more than) the threshold voltage Vth ("YES" in step S76), the operation flow goes to step S78. In step S38, In step S38, the control device 30 instructs the relay SMR 2 to be turned on (closed).

In step S40, the control device 30 detects whether or not the predetermined period T1 of time is elapsed.

When the detection result indicates that the predetermined period T1 of time is elapsed ("YES" in step S40), the operation flow goes to step S42. In step S42, the control device 30 instructs the relay SMR2 to be turned off (namely, opened) and the relay SMR1 to be turned on (closed).

After completion of the step S78 or the step S42, the control device 30 completes the diagnostic process shown in FIG. 13.

As described above in detail, the fourth embodiment has the following additional effect (6) in addition to the effects (1), (3) and (4) previously described.

(6) The relay SMR is turned off (namely, opened) when the vehicle driver turns off the starting switch. This makes it possible for the control device 30 to discharge the electric power charged to the capacitor 16 to the diagnostic voltage Vdg. Further, it is possible to diagnose whether or not the emergency discharging control can be correctly executed and completed when the vehicle driver turns on the starting switch. It is thereby possible for the control device 30 to inform the detection result of the above diagnostic result to the vehicle driver without storing the diagnostic result to a memory means such as the EEPROM 30a.

Fifth Embodiment

A description will be given of the electric power conversion system according to the fifth embodiment with reference to FIG. 14.

Figure 14:
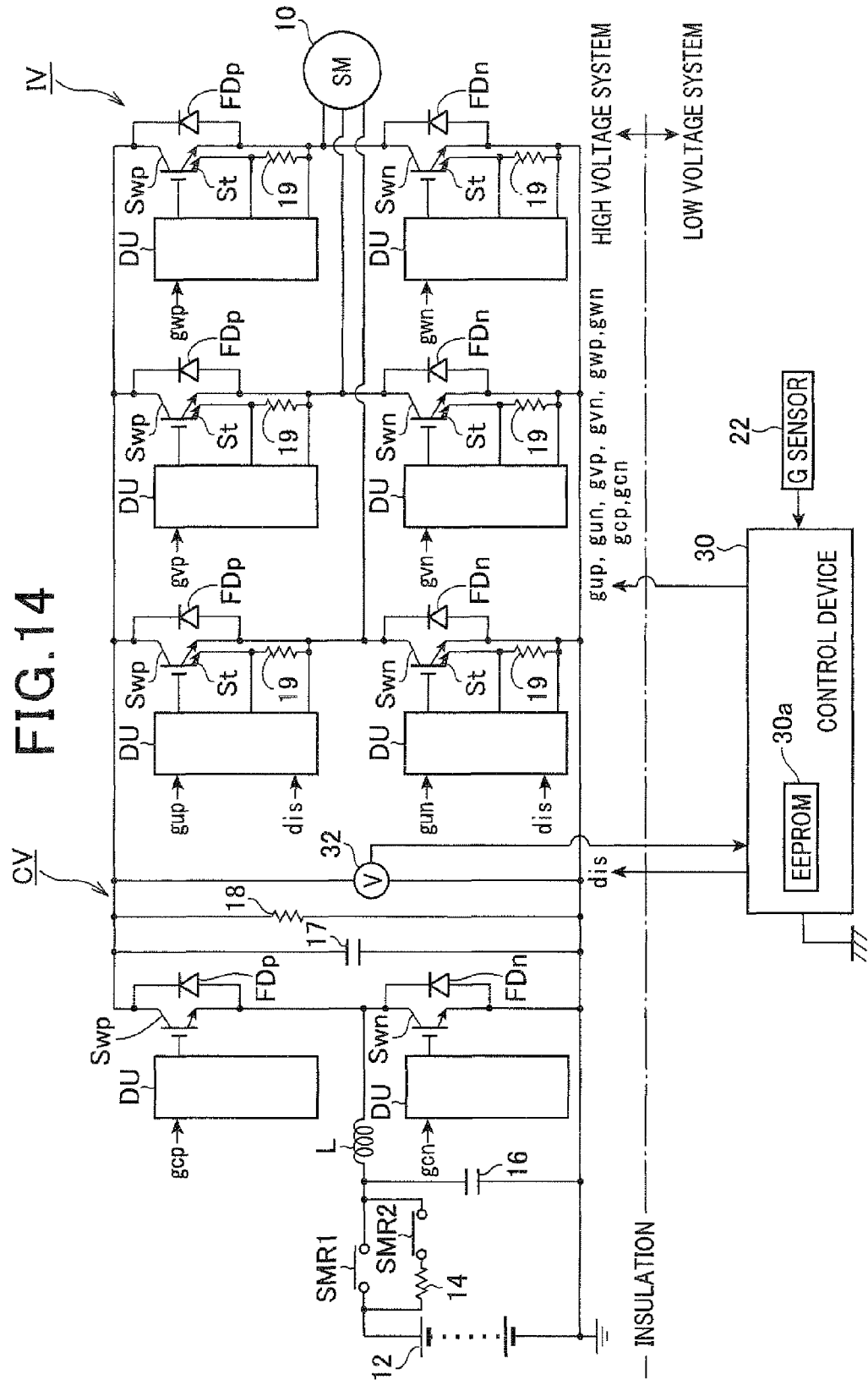
FIG. 14 is a view showing a system configuration of a electric power conversion system equipped with a discharging control device according to a fifth embodiment of the present invention.

FIG. 14 is a view showing a system configuration of the electric power conversion system equipped with the discharging control device according to the fifth embodiment of the present invention.

The difference in the electric power conversion system between the fifth embodiment and the first embodiment will be explained below with reference to FIG. 14. The same components between the processes shown in FIG. 14 and FIG. 1 will be designated with the same reference numbers.

As shown in FIG. 14, a boost converter CV is placed between the inverter IV and the high voltage battery 12. The boost converter CV is comprised of a capacitor 17, a series connection unit composed of a switching element Swp at a high voltage side and a switching element Swn at a low voltage side connected in series, and a reactor L. The series connection unit is connected in parallel to the capacitor 17. The reactor L is placed between the capacitor 16 and a connection node between the switching element Swp at a high voltage side and the switching element at a low voltage side.

In the configuration of the electric power conversion system shown in FIG. 14, the emergency discharging control discharges the electric power stored in the capacitor 16 and the capacitor 17. That is, the electric power stored in the capacitor 16 is discharged through the switching element Swp at a high voltage side and the switching element Swn at a low voltage side. This means that a current flows from the capacitor 16 to the capacitor 17 through the reactor L and a freewheel diode FDp in the boost converter CV when the charged voltage of the capacitor 17 becomes lower than the charged voltage of the capacitor 16.

Thus, the electric power conversion system according to the fifth embodiment has the same effects of the electric power conversion system according to the first or fourth embodiment.

(Other Modifications)

In the first to fifth embodiments previously described, it is further possible to have the following modifications.

<Diagnostic Means for Detecting Whether or not the Emergency Discharging Control is Correctly Executed and Completed>

Instead of detecting the voltage drop of the capacitor 16 or the capacitor 17, it is possible to detect a current flowing in the discharging path or line in order to diagnose whether or not the capacitor correctly discharges its charged electric power.

For example, it is possible to use an output current provided through the sense terminal St or to use a current sensor composed of a hall-effect element mounted to the discharging path.

<Detection Means>

The first to fourth embodiments previously described use the control device 30 capable of detecting error condition of the components mounted to the electric power conversion system, where the control device 30 is placed in a low voltage system side and generates and outputs the operation signals gup, gun, gyp, gvn, gwp and gwn. However, the concept of the present invention is not limited by the above structure. For example, it is possible for the electric power conversion system to have a special means capable of generating the emergency discharging instruction signal dis. In this configuration, it is preferable for the control device 30 to also generate the emergency discharging instruction signal dis in addition to the special means.

For example, it is possible to generate the control signal to be supplied to the drive unit by a logical junction between the signal from the special means and the signal from the control device 30.

Even if the control device 30 does not generate the emergency discharging instruction signal dis, it is possible to diagnose the function of the emergency discharging control when the special means can generate and output the emergency discharging instruction signal dis.

The first to fifth embodiments previously described use the G sensor 22 which can detect the occurrence of collision with an obstacle such as another motor vehicle. The concept of the present invention is not limited by this. For example, it is possible to detect the occurrence of collision on the basis of the diagnostic means capable of detecting error operation of the electric power conversion system equipped with the motor generator, the inverter IV, and the boot converter CV.

<Drive Unit DU>

The first to fifth embodiments previously described use a plurality of the drive units DU, each of which is comprised of the charging switching element 42 used in the usual operation, the discharging switching element 46 used in the usual operation, the charging switching element 52 used in the emergency discharging control operation and the discharging switching element 54 used in the emergency discharging control operation.

However, the concept of the present invention is not limited by the drive unit having the above structure. For example, it is possible to use the mean for supplying a different voltage to the input terminal of the corresponding power switching element in the usual operation and the emergency discharging control operation, instead of using the above switching elements.

<Discharging Means for Usual Operation>

The first to fifth embodiments previously described use the discharging resistance 18 and the process to flow the reactive current in the motor generator 10. However, the concept of the present invention is not limited by the drive unit having the above structure. For example, instead of using this structure, it is possible to use an operation means and a discharging circuit composed of a relay and a resistance between the positive electrode and the negative electrode of the inverter IV, and the operation means controls the relay.

<Emergency Discharging Control Means>

The first to fifth embodiments previously described use the emergency discharging control means which repeatedly turns on and off many times the power switching element Swp at a high voltage side while the power switching element Swn at a low voltage side is continuously turned on in order to make many times a short circuit between the positive electrode and the negative electrode of the capacitor 16 and/or the capacitor 17.

However, the concept of the present invention is not limited by the drive unit having the above structure. For example, it is possible to use another emergency discharging control means which repeatedly turns on and off many times the power switching element Swn at a low voltage side while the power switching element Swp at a high voltage side is continuously turned on in order to make many times a short circuit between the positive electrode and the negative electrode of the capacitor 16 and/or the capacitor 17. In this case, it is preferable to supply a lower voltage to the gate terminal of the power switching element which is turned on and off many times in order to perform in its unsaturated condition.

Still further, it is preferable to turn on and off many times the power switching element Swp at a high voltage side while the power switching element Swn at a low voltage side simultaneously.

It is acceptable to adjust the voltage to be supplied to the gate terminal of the power switching element in order to perform at least one of the power switching element Swp and the power switching element Swn in its unsaturated zone. On the other hand, it is also acceptable to adjust the voltage to be supplied to the gate terminal of the power switching element in order to perform the power switching element Swp and the power switching element Swn in their unsaturated zone.

Still further, it is acceptable to turn on at once the power switching element Swp at a high voltage side and the power switching element Swn at a low voltage side during the discharging control period.

The first to fifth embodiments previously described perform the discharging control by using a pair of the power switching element Swp at a high voltage side and the power switching element Swn at a low voltage side which supply the voltage to one phase of the motor generator 10. However, the concept of the present invention is not limited by the drive unit having the above structure. For example, it is possible to simultaneously turn on the power switching elements Swp at a high voltage side and the power switching elements Swn at a low voltage side for all phased of the motor generator 10.

Still further, it is acceptable to turn on the power switching element Swp at a high voltage side and the power switching element Swn at a low voltage side in order in each of the phases of the motor generator 10.

As previously described, the first to fifth embodiments execute the discharging control by using the pair of the power switching element Swp at a high voltage side and the power switching element Swn at a low voltage side in the inverter IV. However, the concept of the present invention is not limited by the drive unit having the above structure. For example, it is possible to execute the discharging control by using a power switching element Swp at a high voltage side and the power switching element Swn at a low voltage side in the boost converter CV shown in FIG. 14.

<Diagnostic Voltage>

The first to fifth embodiments previously described use the diagnostic voltage of not more than 60 Volts. However, the concept of the present invention is not limited by the drive unit having the above structure. For example, it is possible to use the diagnostic voltage of not more than 42 Volts.

<DC-AC Power Conversion Circuit>

The first to fifth embodiments previously described use the inverter IV as the DC-AC power conversion circuit (as an electric power conversion circuit) capable of converting the electric power between the motor generator 10 as the on-vehicle main machine and the high voltage battery 12, and the power switching element Swp at a high voltage side and the power switching element Swn at a low voltage side are simultaneously turned on during the emergency discharging control. However, the concept of the present invention is not limited by the drive unit having the above structure. For example, it is possible to use a circuit capable of transmitting electric power between the high voltage battery 12 and an electric rotary machine mounted to an air conditioning system other than the on-vehicle main machine.

<Memory Means for Storing Diagnostic Result>

The first to fifth embodiments previously described use the EEPROM 30a in the control device 30 as the memory means for storing the diagnostic result. However, the concept of the present invention is not limited by the drive unit having the above structure. For example, it is possible to use a random access memory (RAM or a backup RAM) instead of the EEPROM 30a. Such a RAM can receive an electric power regardless of supplying and halting the electric power to the control device 30 or a central processing unit in the control device 30.

<Other Modifications>

In the structure according to the third embodiment previously described, it is acceptable to continuously flow the reactive current into the motor generator 10 in order to execute the discharging control regardless of the diagnostic result to indicate the presence or absence of error of the emergency discharging control.

In the structure according to the third embodiment previously described, it is acceptable to discharge the electric power charged in the capacitor 16 through the discharging resistance 18 instead of flowing the reactive current in the motor generator 10 in order to execute the emergency discharging control.

The first to fifth embodiments execute the emergency discharging control by using use the IGBT as the power switching element Swp at a high voltage side and the power switching element Swn at a low voltage side. However, the concept of the present invention is not limited by the drive unit having the above structure. For example, it is possible to use a field effect transistor such as a power MOS field effect transistor instead of such an IGBT.

In addition to hybrid vehicles, it is possible to apply the electric power conversion system equipped with the discharging control device to electric vehicles equipped with motor generator only as the on-vehicle main machine.

The discharging control device according to the present invention can be applied to electric power conversion systems for use in residential buildings and commercial buildings, which convert DC electric power to AC electric power. In this case, the emergency indicates the occurrence of an earthquake, for example.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A discharging control device for an electric power conversion system which is comprised of an electric power conversion circuit, a capacitor, an electrical power switching device, a discharging control unit and a series connection unit, the electric power conversion circuit converting a direct current (DC) power of a DC power source to a predetermined alternating current (AC) power, the capacitor being placed between the electric power conversion circuit and the DC power source, the electrical switching device opens/closes electrical connections between the electric power conversion circuit and the capacitor, and the discharging control device for adjusting a charged voltage of the capacitor to a voltage of not more than a predetermined voltage by operating the electric power conversion circuit when the electrical switching device is turned off, wherein the electric power conversion circuit is comprised of a diagnostic unit, the series connection unit is connected in parallel to the capacitor, the series connection unit is comprised of a switching element at a high voltage side and a switching element at a low voltage side, the discharging control unit, under the control by the discharging control device, makes a short circuit between both electrodes of the capacitor by turning on the switching element at a high voltage side and the switching element at a low voltage side simultaneously, the diagnostic unit is configured to diagnose whether or not the discharging control unit correctly executes the discharging control by instructing the discharging control unit to execute the discharging control after the electrical switching device is switched from its turned-on state to turned-off state in order to detect whether or not the capacitor actually discharges its charged electric power, and further comprising a detection unit configured to detect whether or not components of a system to which the electric power conversion system is mounted enter an abnormal state, wherein the discharging control unit is an emergency discharging control unit (a) for making a short circuit between the electrodes of the capacitor by turning on the switching element at a high voltage side and the switching element at a low voltage side simultaneously when the detection result of the detection unit indicates the occurrence of entering the abnormal state, the discharging control unit further comprises an usual discharging control unit which instructs (b) the capacitor to discharge its charged electric power without making any short circuit between the electrodes of the capacitor when the electrical switching device is turned off and the detection unit does not indicate the occurrence of entering the abnormal state, and the diagnostic unit is configured to diagnose whether or not the discharging control unit correctly executes the discharging control by instructing the usual discharging control unit in order to instruct the capacitor to perform the above operation (b), instead of instructing the emergency discharging control unit as the discharging control unit to execute the above operation (a) in order to diagnose whether or not the discharging control unit correctly executes the discharging control.

2. The discharging control device according to claim 1, wherein the diagnostic unit instructs the emergency discharging control unit to execute the discharging control so that the capacitor is discharged by the usual discharging control unit when the electrical switching device is turned off.

3. The discharging control device according to claim 1, wherein the electric power conversion system is mounted to a motor vehicle, the electrical switching device is turned off when a starting switch of the motor vehicle is turned off, the usual discharging control unit instructs the electrical switching device to be turned off in order to discharge the electric power charged in the capacitor to a predetermined voltage when the starting switch of the motor generator is turned off, and the diagnostic unit instructs the emergency discharging control to execute the discharging control when the starting switch of the motor vehicle is turned on.

4. The discharging control device according to claim 1, wherein the usual discharging control unit is a resistance which is connected in parallel to the capacitor.

5. The discharging control device according to claim 1, wherein the electric power conversion system transmits electric power between an on-vehicle main machine mounted on a motor vehicle and the DC power source, the electrical switching device is turned off when a starting switch of the motor vehicle is turned off, the discharging control unit is turned off when the starting switch of the motor vehicle is turned off, the electric power conversion system further comprises a memory unit configured to continuously store data even if the discharging control unit is turned off, the diagnostic unit is configured to diagnose whether or not the emergency discharging control can be correctly executed and completed after the electrical switching device is turned off when the starting switch is turned off, and the diagnostic unit stores the diagnostic result into the memory unit.

6. The discharging control device according to claim 5, wherein the discharging control unit is turned on and reads the data stored in the memory unit when the starting switch is turned on, and the discharging control unit informs the diagnostic result to the outside of the electric power conversion system when the data read from the memory unit indicates that the emergency discharging control is not correctly executed and completed.

7. The discharging control device according to claim 1, wherein each of the switching element at a high voltage side and the switching element at a low voltage side is a switching element of a voltage controlled type, the discharging control unit determines a voltage to be supplied to a conductive control terminal of at least one of the switching element at a high voltage side and the switching element at a low voltage side so that a current flowing in at least one of the switching element at a high voltage side and the switching element at a low voltage side in its unsaturated zone becomes smaller than a usual current to be supplied to the switching elements in the electric power conversion circuit in a usual operation.

8. The discharging control device according to claim 7, wherein one of the switching element at a high voltage side and the switching element at a low voltage side is turned on, and the other switching element must be turned off when the electric power conversion circuit performs its usual operation.

9. The discharging control device according to claim 7, wherein the electric power conversion circuit comprises a direct current to alternating current (DC-AC) conversion circuit for converting a direct current power stored in the DC power source to an electric rotary machine, and the electric power conversion circuit transmits the electric power between the electric rotary machine and the DC power source in order to drive the electric rotary machine.

10. A discharging control device for an electric power conversion system which is comprised of an electric power conversion circuit, a capacitor, an electrical power switching device, a discharging control unit and a series connection unit, the electric power conversion circuit converting a direct current (DC) power of a DC power source to a predetermined alternating current (AC) power, the capacitor being placed between the electric power conversion circuit and the DC power source, the electrical switching device opens/closes electrical connections between the electric power conversion circuit and the capacitor, and the discharging control device for adjusting a charged voltage of the capacitor to a voltage of not more than a predetermined voltage by operating the electric power conversion circuit when the electrical switching device is turned off, wherein the electric power conversion circuit is comprised of a diagnostic unit, the series connection unit is connected in parallel to the capacitor, the series connection unit is comprised of a switching element at a high voltage side and a switching element at a low voltage side, the discharging control unit, under the control by the discharging control device, makes a short circuit between both electrodes of the capacitor by turning on the switching element at a high voltage side and the switching element at a low voltage side simultaneously, and the diagnostic unit is configured to diagnose whether or not the discharging control unit correctly executes the discharging control by instructing the discharging control unit to execute the discharging control after the electrical switching device is switched from its turned-on state to turned-off state in order to detect whether or not the capacitor actually discharges its charged electric power, and further comprising a discharging device for discharging the electric power charged in the capacitor without making a short circuit between the electrodes of the capacitor, wherein the diagnostic unit is configured to diagnose whether or not the emergency discharging control can be correctly executed and completed by instructing the discharging control unit to turn off the electrical switching device in order to discharge a part of the electric power charged in the capacitor, and when the diagnostic result indicates that the emergency discharging control is not correctly executed and completed, the diagnostic unit instructs the discharging device to discharge the electric power charged in the capacitor without making a short circuit between the electrodes of the capacitor.

11. The discharging control device according to claim 1, wherein the electric power conversion circuit comprises a DC to AC (DC-AC) conversion circuit for converting a DC power stored in the DC power source to an AC power and supplying the AC power to the electric rotary machine, and the usual discharging control unit instructs the DC-AC conversion circuit to generate and supply a reactive current to the electric rotary machine in order to discharge the electric power charged in the capacitor.

12. A discharging control device for an electric power conversion system which is comprised of an electric power conversion circuit, a capacitor, an electrical power switching device, a discharging control unit and a series connection unit, the electric power conversion circuit converting a direct current (DC) power of a DC power source to a predetermined alternating current (AC) power, the capacitor being placed between the electric power conversion circuit and the DC power source, the electrical switching device opens/closes electrical connections between the electric power conversion circuit and the capacitor, and the discharging control device for adjusting a charged voltage of the capacitor to a voltage of not more than a predetermined voltage by operating the electric power conversion circuit when the electrical switching device is turned off, wherein the electric power conversion circuit is comprised of a diagnostic unit, the series connection unit is connected in parallel to the capacitor, the series connection unit is comprised of a switching element at a high voltage side and a switching element at a low voltage side, the discharging control unit, under the control by the discharging control device, makes a short circuit between both electrodes of the capacitor by turning on the switching element at a high voltage side and the switching element at a low voltage side simultaneously, the diagnostic unit is configured to diagnose whether or not the discharging control unit correctly executes the discharging control by instructing the discharging control unit to execute the discharging control after the electrical switching device is switched from its turned-on state to turned-off state in order to detect whether or not the capacitor actually discharges its charged electric power, the electric power conversion system transmits electric power between an on-vehicle main machine mounted on a motor vehicle and the DC power source, the electrical switching device is turned off when a starting switch of the motor vehicle is turned off, the discharging control unit is turned off when the starting switch of the motor vehicle is turned off, the electric power conversion system further comprises a memory unit configured to continuously store data even if the discharging control unit is turned off, the diagnostic unit is configured to diagnose whether or not the emergency discharging control can be correctly executed and completed after the electrical switching device is turned off when the starting switch is turned off, and the diagnostic unit stores the diagnostic result into the memory unit.

* * * * *